United States Patent
Hamada

(10) Patent No.: US 8,645,526 B2
(45) Date of Patent: Feb. 4, 2014

(54) INFORMATION PROCESSING APPARATUS AND CONTROL METHOD THEREFOR, INFORMATION PROCESSING SYSTEM, COMPUTER PROGRAM AND STORAGE MEDIUM

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1319 days.

(21) Appl. No.: 12/088,521

(22) PCT Filed: Sep. 28, 2006

(86) PCT No.: PCT/JP2006/319914
§ 371 (c)(1),
(2), (4) Date: Mar. 28, 2008

(87) PCT Pub. No.: WO2007/043422
PCT Pub. Date: Apr. 19, 2007

(65) Prior Publication Data
US 2010/0257265 A1 Oct. 7, 2010

(30) Foreign Application Priority Data
Oct. 7, 2005 (JP) .................. 2005-295554

(51) Int. Cl.
*G06F 15/173* (2006.01)
(52) U.S. Cl.
USPC ............. 709/224; 709/200; 709/227; 455/95; 455/899
(58) Field of Classification Search
USPC ........... 709/224, 200, 203, 227; 455/41.2, 95, 455/899
See application file for complete search history.

(56) References Cited

U.S. PATENT DOCUMENTS

| | | | |
|---|---|---|---|
| 6,519,004 B1* | 2/2003 | Bahl | 348/385.1 |
| 7,221,667 B2 | 5/2007 | Hori | |
| 2004/0125778 A1* | 7/2004 | Lin et al. | 370/338 |
| 2004/0183756 A1* | 9/2004 | Freitas et al. | 345/73 |
| 2006/0008256 A1* | 1/2006 | Khedouri et al. | 386/124 |
| 2006/0223524 A1* | 10/2006 | Ginzburg | 455/424 |
| 2006/0258286 A1* | 11/2006 | Qi et al. | 455/41.2 |

FOREIGN PATENT DOCUMENTS

| | | |
|---|---|---|
| EP | 1 528 834 | 5/2005 |
| JP | 2000-269884 | 9/2000 |
| JP | 2000269884 A * | 9/2000 |
| JP | 2003-018234 | 1/2003 |

(Continued)

OTHER PUBLICATIONS

Chinese Office Action dated Feb. 27, 2009 during prosecution of related Chinese application No. 2006800371024.

(Continued)

*Primary Examiner* — El Hadji Sall
(74) *Attorney, Agent, or Firm* — Fitzpatrick, Cella, Harper & Scinto

(57) ABSTRACT

An information processing provided with a wireless communication unit adapted to communicate with a wireless network formed by a control apparatus, comprises: a first sending unit adapted to send a probe signal including identification data of the network via the wireless communication unit; a receiving unit adapted to receive a response signal to the probe signal from another information processing apparatus associated with the control apparatus via the wireless communication unit; and a determination unit adapted to determine an information processing apparatus capable of direct link communication, based on the response signal received by the receiving unit.

13 Claims, 22 Drawing Sheets

(56) References Cited

FOREIGN PATENT DOCUMENTS

| | | |
|---|---|---|
| JP | 2003-018515 | 1/2003 |
| JP | 2003-209613 | 7/2003 |
| JP | 2003-249939 | 9/2003 |
| JP | 2003249939 A * | 9/2003 |
| JP | 2003-348103 | 12/2003 |
| JP | 2004-128785 | 4/2004 |
| JP | 2004-254254 | 9/2004 |
| JP | 2005-033536 | 2/2005 |
| TW | 589841 | 6/2004 |

OTHER PUBLICATIONS

European Search Report dated Mar. 5, 2012 issued during prosecution of related European application No. 06811252.3.

* cited by examiner

FIG. 5

| Frame Subtype | IBSS non-QoS CP STA | QoS CP STA | non-QoS CP STA | non-QoS CP AP | non-QoS CFP STA | non-QoS CFP AP | QoS CP QSTA | QoS CP QAP | QoS CFP QSTA | QoS CFP QAP |
|---|---|---|---|---|---|---|---|---|---|---|
| (Re)Association Request | T,R | T,R | T | | | | T | R | | |
| (Re)Association Response | Tbe,R | Tbe,R | R | T | | | R | T | | T |
| Probe Request | Tb,R | Tb,R | T,R | T,R | | | T,R | T,R | | |
| Probe Response | T,R | T,R | T,R | T,R | | | T,R | T,R | | T,R |
| Beacon | T,R | T,R | R | T | | | R | T | | T |
| ATIM | T,R | T,R | | | | | | | | |
| Disassociation | T,R | T,R | T,R | T,R | T,R | T,R | T,R | T,R | T,R | T,R |
| Authentication | T,R | T,R | T,R | T,R | | | T,R | T,R | | |
| Deauthentication | T,R | T,R | T,R | T,R | T,R | T,R | T,R | T,R | T,R | T,R |
| ADDTS Request | | | | | | | T | R | T | R |
| ADDTS Response | | | | | | | R | T | R | T |
| DELTS | | | | | | | T,R | T,R | T,R | T,R |
| Schedule | | | | | | | R | T | R | T |
| DLS Action frames | | | | | | | T,R | R | | |
| Block Ack Action frames | | | | | | | T,R | T,R | T,R | T,R |
| BlockAckReq/BlockAck | | | | | | | T,R | T,R | T,R | T,R |
| PS-Poll | | | T | R | | | T | R | | |
| RTS | T,R | T,R | T,R | T,R | T,R | T,R | T,R | T,R | T,R | T,R |
| CTS | (R) | (R) | (R) | T,R | (R) | T,R | (R) | T,R | (R) | T,R |
| ASK | (R) | (R) | (R) | T,R | (R) | T,R | (R) | T,R | (R) | T,R |
| CF-End | | | | | R | T | | | R | T |
| CF-End+CF-Ack | | | | | R | T | | | R | T |
| Null | T,R | T,R | T,R | T,R | T,R | T,R | T,R | T,R | T,R | T,R |
| Data | T,R | T,R | T,R | T,R | T,R | T,R | | | | |
| (Data+)CF-Poll(+CF-Ack) | | | | | | R | T | | | |
| (Data+)CF-Ack | | | | | T,R | T,R | | | | |
| QoS Null | | T,R | | | | | T,R | T,R | T,R | T,R |
| QoS Data | | T,R | | | | | T,R | T,R | T,R | T,R |
| QoS (Data+)CF-Poll | | | | | | | Rq, Rda | Tda, TqR | q, Rda | Tda, Tq |
| QoS (Data+)CF-Poll+CF-Ack | | | | | | | Rq,Rq,Rda | Tda,Tq,R | T,R,Rda,Rq | T,R,Rda,Rq |
| QoS Data+CF-Ack | | | | | | | R | T,R | R | T,R |

Frame Subtype usage by BSS type, MAC entity type, Coordination function

FIG. 6

| Frame Subtype | IBSS | | | non-QoS | | | | QoS | | | | | |
|---|---|---|---|---|---|---|---|---|---|---|---|---|---|
| | non-QoS CP STA | QoS CP STA | | CP STA | CP AP | CFP STA | CFP AP | CP QSTA | CP QAP | QSTA | QAP | CFP | QAP |
| (Re)Association Request | T,R 601 | T,R | | T | | | | T 602 | R | | R | | |
| (Re)Association Response | | T,R | | R | T | | | R 603 | T | | T | | |
| Probe Request | Tbe,R | Tb,R | | T,R | T,R | | | R | R | R | R | | |
| Probe Response | Tb,R | Tb,R | | R | T | | | R | T | R | T | T,R | T,R |
| Beacon | T,R | T,R | | R | T | | | R | T | R | T | | |
| ATIM | T,R | T,R | | | | | | | | | | | |
| Disassociation | T,R | T,R | | T,R | T,R | T,R | T,R | T,R | T,R | T,R | T,R | | |
| Authentication | T,R | T,R | | T,R | T,R | | | T,R | T,R | T,R | T,R | | |
| Deauthentication | T,R | T,R | | T,R | T,R | T,R | T,R | T,R | T,R | T,R | T,R | | |
| ADDTS Request | | | | | | | | T | R | T | R | | |
| ADDTS Response | | | | | | | | R | T | R | T | | |
| DELTS | | | | | | | | T,R | T,R | T,R | T,R | | |
| Schedule | | | | | | | | R | T | R | T | | |
| DLS Action frames | | T,R | | | | | | T,R | T,R | T,R | T,R | | |
| Block Ack Action frames | | | | | | | | T,R | T,R | T,R | T,R | | |
| BlockAckReq/BlockAck | | | | | | | | T,R | T,R | T,R | T,R | | |
| PS-Poll | | | | T | R | | | T | R | T | R | | |
| RTS | T,R | T,R | | T,R | T,R | | | T,R | T,R | T,R | T,R | | |
| CTS | T,R | T,R | | T,R | T,R | | | T,R | T,R | T,R | T,R | | |
| ASK | T,R | T,R | | T,R | T,R | T,R | T,R | T,R | T,R | T,R | T,R | | |
| CF-End | (R) | (R) | | (R) | (R) | R | T | (R) | (R) | (R) | (R) | | |
| CF-End+CF-Ack | (R) | (R) | | (R) | (R) | R | T | (R) | (R) | (R) | (R) | | |
| Null | T,R | T,R | | T,R | T,R | T,R | T,R | R | T | R | T | | |
| Data | T,R | T,R | | T,R | T,R | R | T,R | R | | R | | | |
| (Data+)CF-Poll(+CF-Ack) | | | | | | R | T,R | | | | | | |
| (Data+)CF-Ack | | | | | | T,R | T,R | | | | | | |
| QoS Null | | T,R | | | | | | T,R | T,R | T,R | T,R | | |
| QoS Data | | T,R | | | | | | T,R | T,R | T,R | T,R | | |
| QoS (Data+)CF-Poll | | | | | | | | Rg,Rda | Tda,TqR | T,R,Rda,Rq | T,R,Rda,Rq | T,R,Rda,Rq | T,R,Rda,Rq |
| QoS (Data+)CF-Poll+CF-Ack | | | | | | | | T,Rq,Rda | Tda,Tq,R | T,R | T,R | T,R | T,R |
| QoS Data+CF-Ack | | | | | | | | R | Tda,Tq,R | q,Rda | Tda,Td,R | Tda,Td,R | Tda,Td,R |

Frame Subtype usage by BSS type, MAC entity type, Cordination function

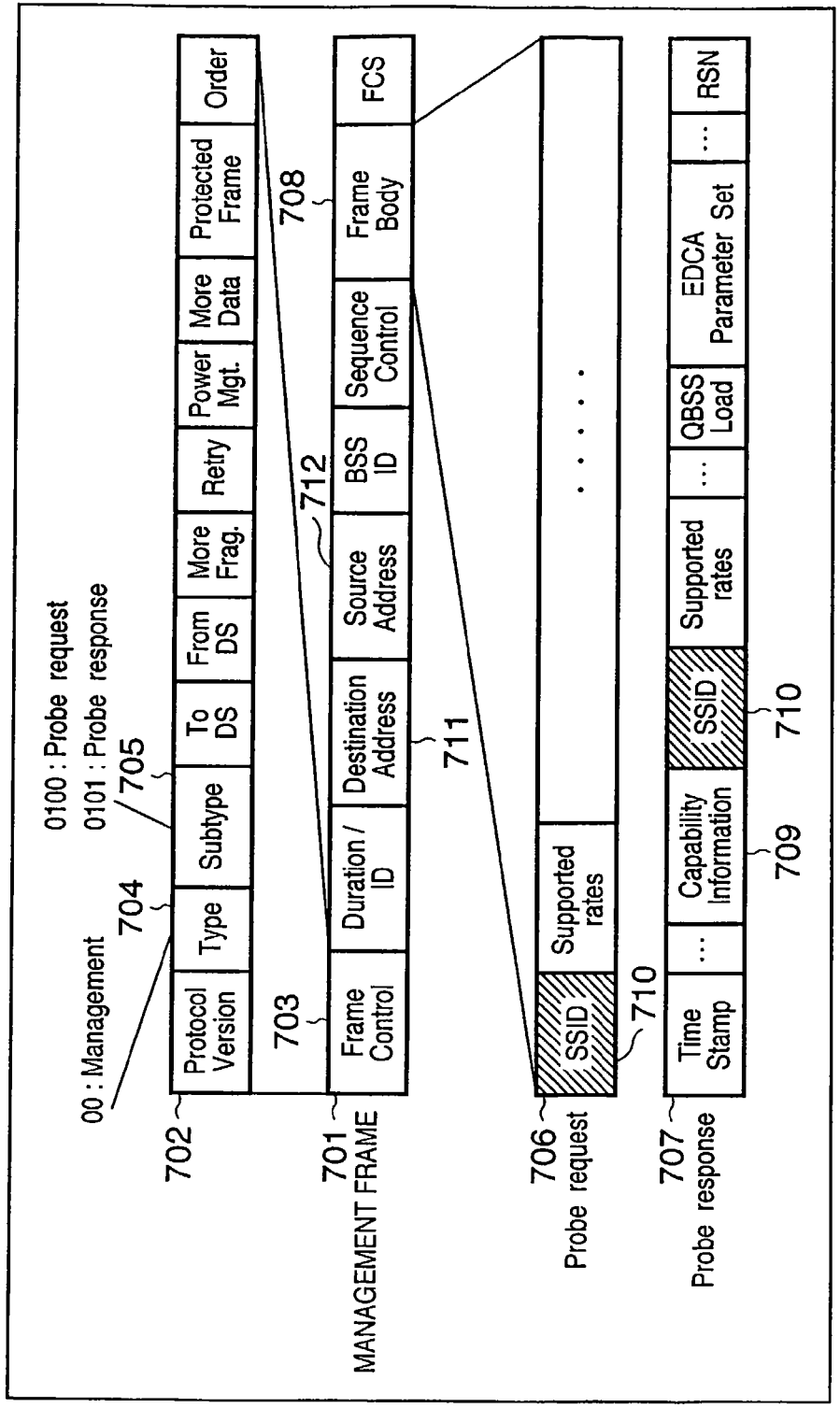

INFORMATION PROCESSING APPARATUS AND CONTROL METHOD THEREFOR, INFORMATION PROCESSING SYSTEM, COMPUTER PROGRAM AND STORAGE MEDIUM

TECHNICAL FIELD

The present invention relates to an information processing technology, and in particular, relates to an information processing technology capable of determining availability of wireless communication by a direct link with an external apparatus.

BACKGROUND ART

Conventionally, as services to set communication channels between wireless terminals, wireless direct link services providing direct linking, and wireless indirect link services providing indirect linking via a wireless access point (base station) are known. In addition, wireless communication systems capable of providing both wireless direct link services and wireless indirect link services are known.

Furthermore, a method is known for deciding which service should be selected when setting a communication channel in above-described wireless communication systems. For instance, a configuration is known in which a wireless direct link service is selected according to an instruction from the side of a wireless access point (Japanese Patent Application. Laid-Open. No. 2005-33536).

In addition, techniques for switching communication services during communication are known. For instance, a method is known in which switching to wireless direct link service communication may be performed during wireless indirect link service communication when a receiving-side terminal is able to receive transmitted data addressed to itself from a transmission source terminal via a base station at or above a specific level (Japanese Patent Application Laid-Open No. 2004-128785).

Furthermore, the following method is known. After completion of link authentication to a wireless system, a communication partner is first specified from a transmission source terminal using an indirect link service. Next, a test signal is directly transmitted to the partner terminal, and when a response to the test signal is directly received, switching to usage of a wireless direct link service is performed (Japanese Patent Application Laid-Open No. 2003-348103).

Moreover, a method is known in which a destination broadcast probe request signal is transmitted from a wireless terminal, and determination of availability of usage of a wireless direct link service is performed by studying the contents of a corresponding probe response signal (Japanese Patent Application Laid-Open No. 2003-18234).

However, in the configuration disclosed in Japanese Patent Application Laid-Open No. 2005-33536, in order to provide a wireless direct link service, it is required that a wireless access point (base station) always has accurate knowledge regarding positional relationships of wireless terminals within a system. Therefore, the base station must support such processing, and processing by the base station may become complicated.

In addition, in the methods disclosed in Japanese Patent Application Laid-Open. No. 2004-128785 and Japanese Patent Application Laid-Open No. 2003-348103, it is necessary to establish a communication partner wireless terminal before confirming availability of a wireless direct link.

Furthermore, in the method disclosed in Japanese Patent Application Laid-Open No. 2003-18234, a receiving terminal of a probe request signal must send back a probe response signal even when a transmission source of the probe request signal is not a terminal performing the intended communication. Therefore, unnecessary communication traffic will increase on the network system.

DISCLOSURE OF INVENTION

The present invention has been made in consideration of the above problems, and its object is to provide a technique for determining availability of a wireless direct link which does not require expansion of processing by a base station and preliminary establishment of a communication party terminal, which has a small communication traffic load.

According to the present invention, an information processing apparatus is provided which has a wireless communication unit adapted to communicate with a wireless network formed by a control apparatus, the information processing apparatus comprising:

a first sending unit adapted to send a probe signal including identification data of the network via the wireless communication unit;

a receiving unit adapted to receive a response signal to the probe signal from another information processing apparatus associated with the control apparatus via the wireless communication unit; and a determination unit adapted to determine an information processing apparatus capable of direct link communication, based on the response signal received by the receiving unit.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a diagram showing a list of usage by subtype of signal frames defined by IEEE 802.11e/D12;

FIG. 6 is a diagram showing a list of usage by subtype of signal frames;

FIG. 7 is a diagram typically showing frame formats of a probe request and a probe response defined by IEEE 802.11e/D12;

BEST MODE FOR CARRYING OUT THE INVENTION

Embodiments of the present invention will now be described in detail with reference to the drawings attached hereto. However, the components described in these embodiments are merely for illustrative purposes, and are not intended to limit the scope of the present invention to such exemplifications.

First Embodiment

First, an outline of a configuration in which a stream data distribution system according to the present embodiment functions effectively, will be described. For the present embodiment, a description will be provided using a stream data distribution system using a wireless LAN under examination by the IEEE 802.11 Working Group TGe. As for a standard for wireless LAN, 802.11e/D12, which is a draft specification at the present stage, has been released.

A wireless LAN may either assume an infrastructure mode which performs Communication under the management of an access point, or an ad hoc mode which performs communication directly between terminals without the control of an access point. Additionally, IEEE 802.11e/D12 defines a DLS (Direct Link Set-up) in which direct communication is performed between terminals under infrastructure mode.

A terminal desiring to perform DLS communication transmits, when DLS communication becomes necessary, a link request (DLS Request) to a party terminal with whom it wishes to DLS-communicate via an access point. When equipped with DLS functions, the terminal receiving the DLS request sends back response (DLS Response) via the access point. DLS settings between the terminals are thereby concluded.

However, even if a DLS response is received, depending on the distance or presence of obstacles between the terminals and the like, there is no guarantee that DLS communication may actually be performed. Therefore, it is necessary to determine whether DLS communication is actually possible before commencing DLS communication. In consideration of the above, a description will now be given regarding several embodiments which involve determining whether DLS communication is actually possible before commencing DLS communication.

A configuration according to the present embodiment includes, as components, a stream media server (hereinafter referred to as a media server) terminal and a display (hereinafter referred to as a media renderer) terminal. A wireless link configuration used when distributing AV (Audio, Video) stream data from a media server terminal to a media renderer terminal, including an example of processing involving automatic selection and setting of such wireless link configuration, will now be described. In the description, each terminal is assumed to be equipped with a DLS function.

A wireless terminal is alternatively called a client in the sense that it accesses a wireless medium and is a subject which receives communication services. In addition, a wireless access point is alternatively Called a base station.

<System Configuration>

Figure 1:
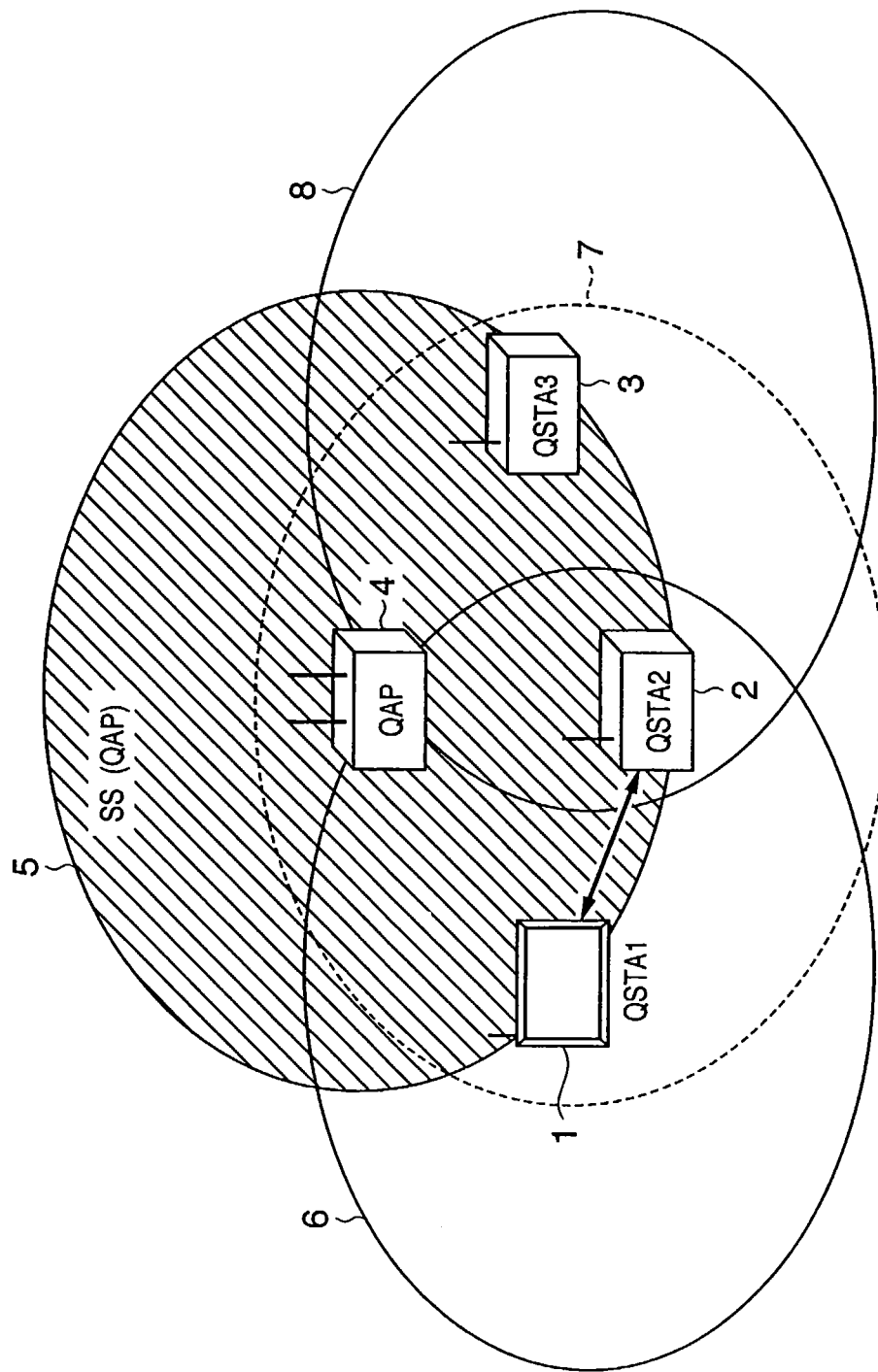
FIG. 1 is a system configuration diagram according to a first embodiment.

Next, a system configuration according to the present embodiment will now be described with reference to FIG. 1. FIG. 1 is a system configuration diagram according to the present embodiment. Reference numeral 1 denotes a media renderer terminal (QSTA1), reference numerals 2 and 3 denote media server terminals (QSTA2, QSTA3), and reference numeral 4 denotes a wireless access point (QAP: QoS Access Point). QSTA1 is an information processing apparatus which receives stream media from QSTA2 and QSTA3, and renders and displays the media on a display. QSTA2 and QSTA3 are information processing apparatuses which retain, stream media data and distribute the media to QSTA1. QSTA1 to QSTA3 are, for instance, respectively realized by a personal computer (PC), a work station (WS), or a mobile phone, a PHS, a personal data assistance (PDA) and the like. QSTA stands for QoS Station, which means a station that is a QoS object.

In addition, reference numeral 5 denotes a service set (SS) formed by QAP4, reference numeral 6 denotes a wireless signal reachable area of the media renderer terminal 1, while reference numerals 7 and 8 respectively denote wireless signal reachable areas of the media server terminals 2 and 3. In the present configuration example, all QSTAs, or in other words, QSTA1 to QSTA3 exist in an area of the SS (Service Set) 5. In addition, it is assumed that the wireless terminals QSTA1 to QSTA3 exist in positions in which setting of DLS between QSTA1 and QSTA2 as well as between QSTA2 and QSTA3 is possible, while DLS setting between QSTA1 and QSTA3 is not.

<Configuration of Media Renderer Terminal 1>

Figure 2:
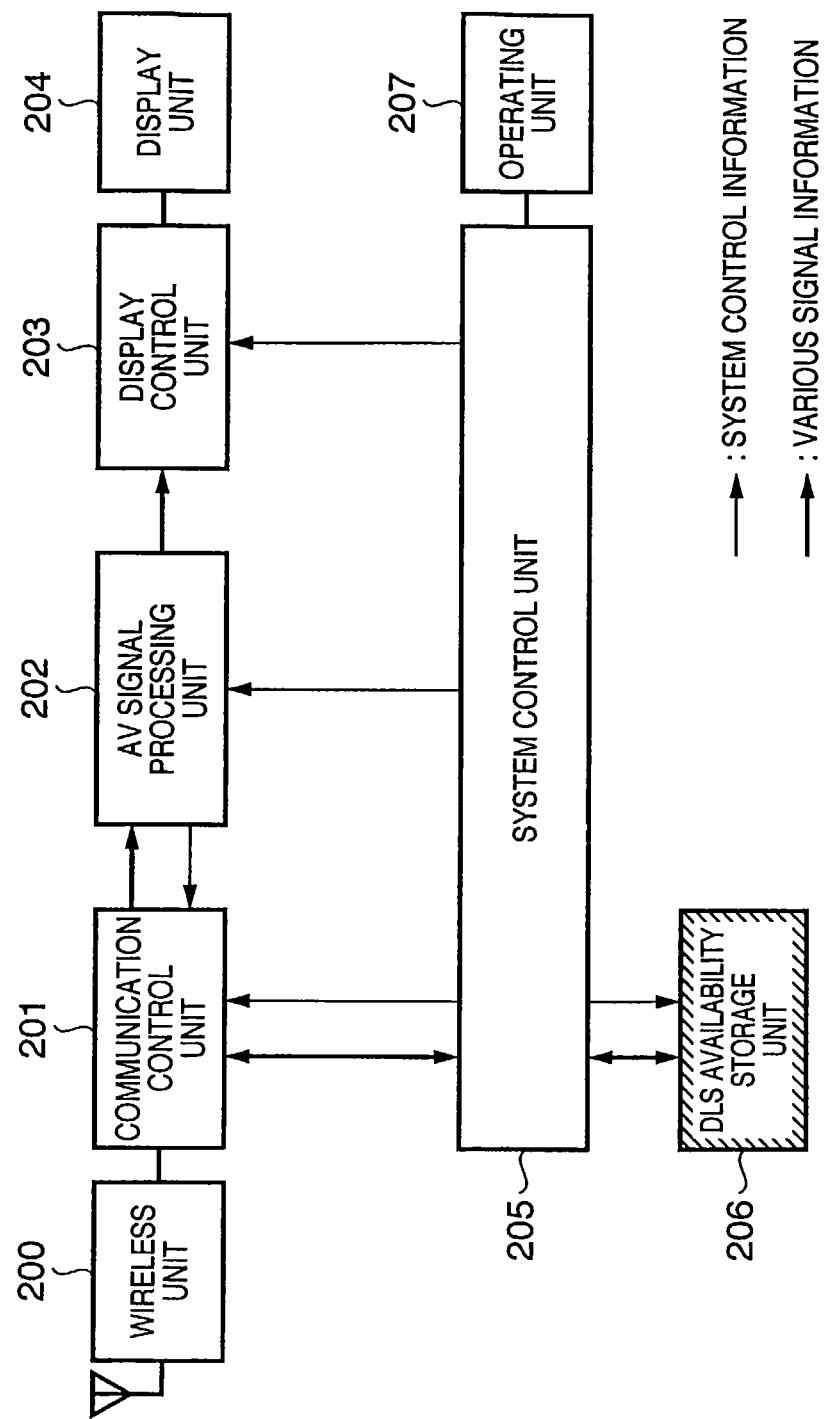
FIG. 2 is a diagram exemplifying a functional block configuration of a media renderer terminal.

Next, a functional configuration of media renderer terminal 1 will now be described with reference to FIG. 2. FIG. 2 is a diagram exemplifying a functional block configuration of the media renderer terminal 1. In FIG. 2, reference numeral 200 denotes a wireless unit realized by an antenna or the like which exchanges wireless signals with an external apparatus. The media renderer terminal 1 exchanges data with an external apparatus via the wireless unit 200.

Reference numeral 201 denotes a communication control unit which controls operation of the wireless unit 200 to manage exchange of data with an external apparatus.

Reference numeral 202 denotes an AV signal processing unit responsible for encoding, decoding and format conversion of AV information. While the present embodiment assumes that AV signal processing is realized by a dedicated LSI or the like, AV signal processing may be realized instead by having a general-purpose CPU control the information processing apparatus according to a predetermined program.

Reference numeral 203 denotes a display control unit which controls displaying on a display unit 204 to be described later. This control is realized by, for instance, a graphic card.

Reference numeral 204 denotes a display unit which is realized by a display apparatus such as a CRT or a liquid crystal display and the like. The display unit, 204 displays images received from the media server terminals 2 and 3, commands inputted from an operating unit 207, to be described later, or response outputs to such commands and the like.

Reference numeral 205 denotes a system control unit which controls operations of the entire media renderer terminal 1, and is realized by a CPU, a motherboard, and a storage device such as a RAM or a ROM or the like. The system control unit 205 executes an application program, an operating system (OS) or a control program and the like stored in a given storage apparatus, and controls the system so that information and files or the like necessary for executing such programs are temporarily stored in the RAM or the like.

Reference numeral 206 denotes a DLS availability storage unit which functions as a storage apparatus for storing information, such as MAC addresses of terminals capable of DLS communication, which indicates whether the media renderer terminal 1 is capable of performing DLS.

Reference numeral 207 denotes an operating unit which accepts input of instructions from a user. The operating unit 207 is realized by, for instance, a touch panel, a ten key, a keyboard or the like.

<Configuration of Media Server Terminals 2 and 3>

Figure 3:
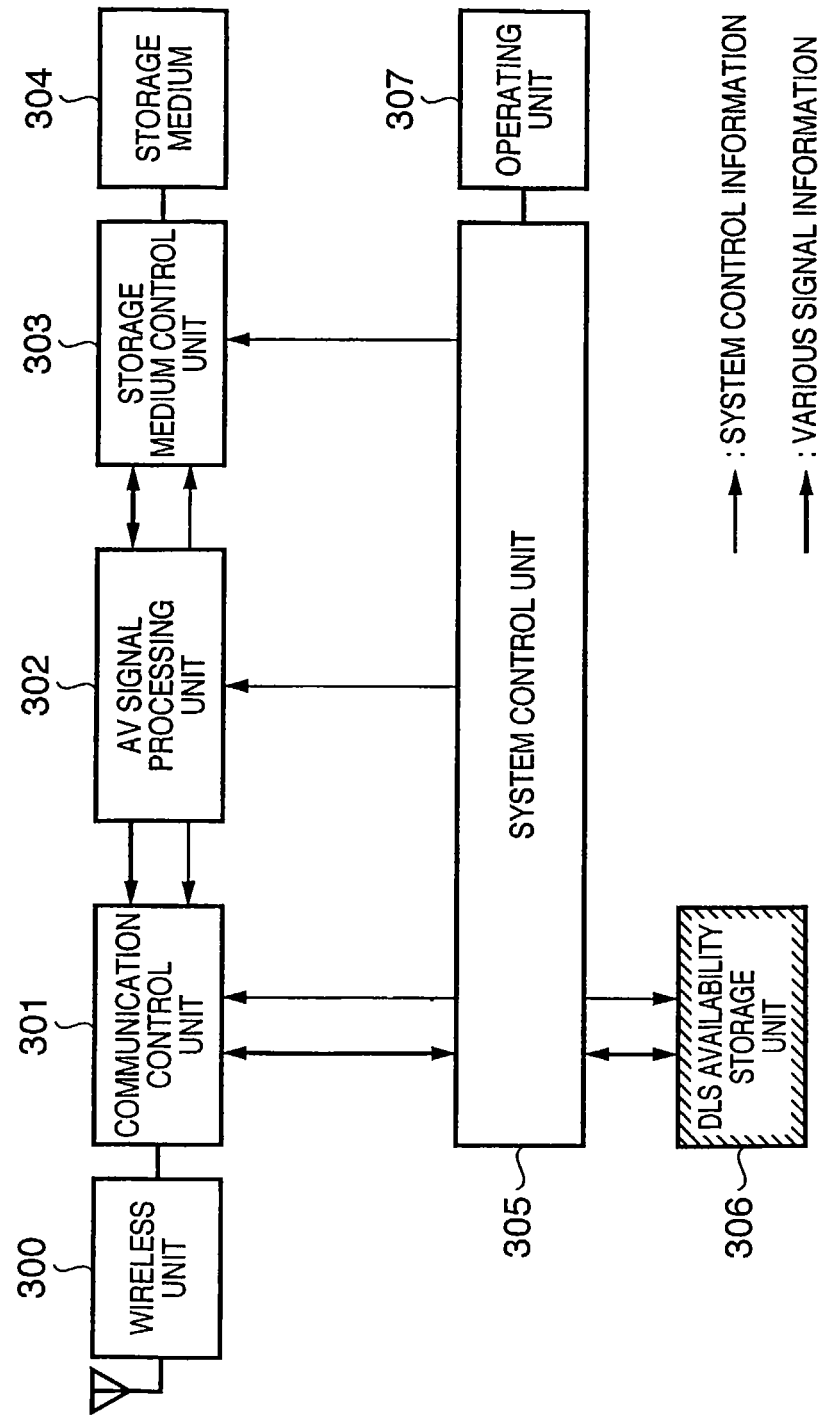
FIG. 3 is a diagram exemplifying a functional block configuration of a media server terminal.

Next, functional configurations of media server terminals 2 and 3 will now be described with reference to FIG. 3. FIG. 3 is a diagram exemplifying functional block configurations of media server terminals 2 and 3. Reference numeral 300 denotes a wireless unit realized by an antenna or the like which exchanges wireless signals with an external apparatus. The media renderer terminal 1 exchanges data with an external apparatus via the wireless unit 300.

Reference numeral 301 denotes a communication control unit which controls operation of the wireless unit 300 to manage exchange of data with an external apparatus.

Reference numeral 302 denotes an AV signal processing unit responsible for encoding, decoding and format conversion of AV information. While the present embodiment assumes that AV signal processing is realized by a dedicated LSI or the like, AV signal processing may instead be realized by having a general-purpose CPU control the information processing apparatus according to a given program.

Reference numeral 303 denotes a storage medium control unit which controls operation of a storage medium 304 to be described later. The storage medium control unit 303 is realized by, for instance, a SCSI controller or an external storage drive for realizing access to the storage medium 304.

Reference numeral 304 denotes a storage medium which functions as a large-capacity memory for storing data including stream media and the like. The storage medium 304 is realized by, for instance, a hard disk (HD) or a predetermined medium. Such media include, for instance, a flexible disk (FD), a CD-ROM, a CD-R, a CD-RW, a PC card, a DVD, an IC memory card, an MO, a memory stick or the like.

Reference numeral 305 denotes a system control unit which controls operations of the entire media server terminals 2 and 3, and is realized by a CPU, a motherboard, and a storage device such as a RAM or a ROM or the like. The system control unit 305 executes an application program, an operating system (OS) or a control program stored in a given storage apparatus, and performs control so that information and files or the like necessary for executing such programs are temporarily stored in the RAM or the like.

Reference numeral 306 denotes a DLS availability storage unit which functions as a storage apparatus for storing information, such as MAC addresses of terminals capable of DLS communication, which indicates whether the media server terminals 2 and 3 are capable of performing DLS.

Reference numeral 307 denotes an operating unit which accepts input of instructions from a user. The operating unit 307 is realized by, for instance, a touch panel, a ten key, a keyboard or the like.

<Signal Frame Usage>

Next, usage patterns by subtype of signal frames defined by IEEE 802.11e/D12 will be described with reference to FIG. 5. FIG. 5 is a diagram showing a list of usage statuses by subtype of signal frames defined by IEEE 802.11e/D12. In other words, FIG. 5 shows information such as a transmitting entity and a receiving entity of a signal frame for each type of signal frame subtype and for each type of communication.

In FIG. 5, reference numeral 501 represents an IBSS (Independent Basic Service Set), or in other words, a service set in an ad hoc mode network configuration. Reference numeral 502 represents a service set in an infrastructure mode (indirect link) network configuration.

Reference numeral 503 represents a communication mode without QoS, while reference numeral 504 represents a communication mode with QoS. Reference numeral 505 represents a contention period (CP), while reference numeral 506 represents a contention free period (CFP). In the drawing, the abbreviation STA denotes a terminal (station), while the abbreviation AP denotes an access point. The abbreviation QSTA denotes a QoS terminal (QoS Station), while the abbreviation QAP denotes a QoS access point. Reference numeral 507 represents a type of a subtype of a frame signal frame. In addition, in the drawing, the abbreviation T denotes transmission, while the abbreviation R denotes reception.

Therefore, for instance, cell 509 indicates that a terminal transmits a probe request signal 508 during a contention period when performing indirect link communication without QoS. In addition, reference numeral 510 represents that an access point receives the transmitted probe request signal.

Next, usage patterns by subtype of signal frames in a configuration according to the present, embodiment will be described with reference to FIG. 6. FIG. 6 is a diagram showing a list of usage statuses by subtype of signal frames in a configuration according to the present embodiment.

In the configuration according to the present embodiment, a reception status (the letter R framed in a rectangle) of a probe request signal is added to cell 602. In addition, a transmission status (the letter T framed in a rectangle) of a probe response signal is added to cells 601 and 603.

<Frame Format>

Next, frame formats of a probe request and a probe response defined by IEEE 802.11e/D12 will be described with reference to FIG. 7. FIG. 7 is a diagram typically showing frame formats of a probe request and a probe response defined by IEEE 802.11e/D12.

In FIG. 7, reference numeral 701 denotes a MAC frame format of a management frame. A probe request used by a terminal to inquire availability of surrounding wireless cells, a probe response for responding to a probe request, a beacon for broadcasting existence of a wireless cell and the like are defined in the management frame.

Reference numeral 702 denotes a frame control field 703 in the management frame 701. A 2-bit type field 704 and a 4-bit subtype field 705 are included in the frame control field 702. A value of "00" in the type field 704 signifies a management field. A value of "0100" in the subtype field 705 signifies a probe request, while a value of "0101" signifies a probe response. Fields such as a destination address 711 indicating an destination address, a source address 712 indicating a transmission source address, a frame body field 708 which stores transmitted data and the like are defined in the management frame 701.

Reference numeral 706 denotes contents of the frame body field 708 when the frame is a probe request, while reference numeral 707 denotes contents of the frame body field 708 when the frame is a probe response. Reference numeral 710 denotes a SSID (Service Set ID), which is an identifier of an ESS (Extended Service Set) or an IBSS.

Figure 8:
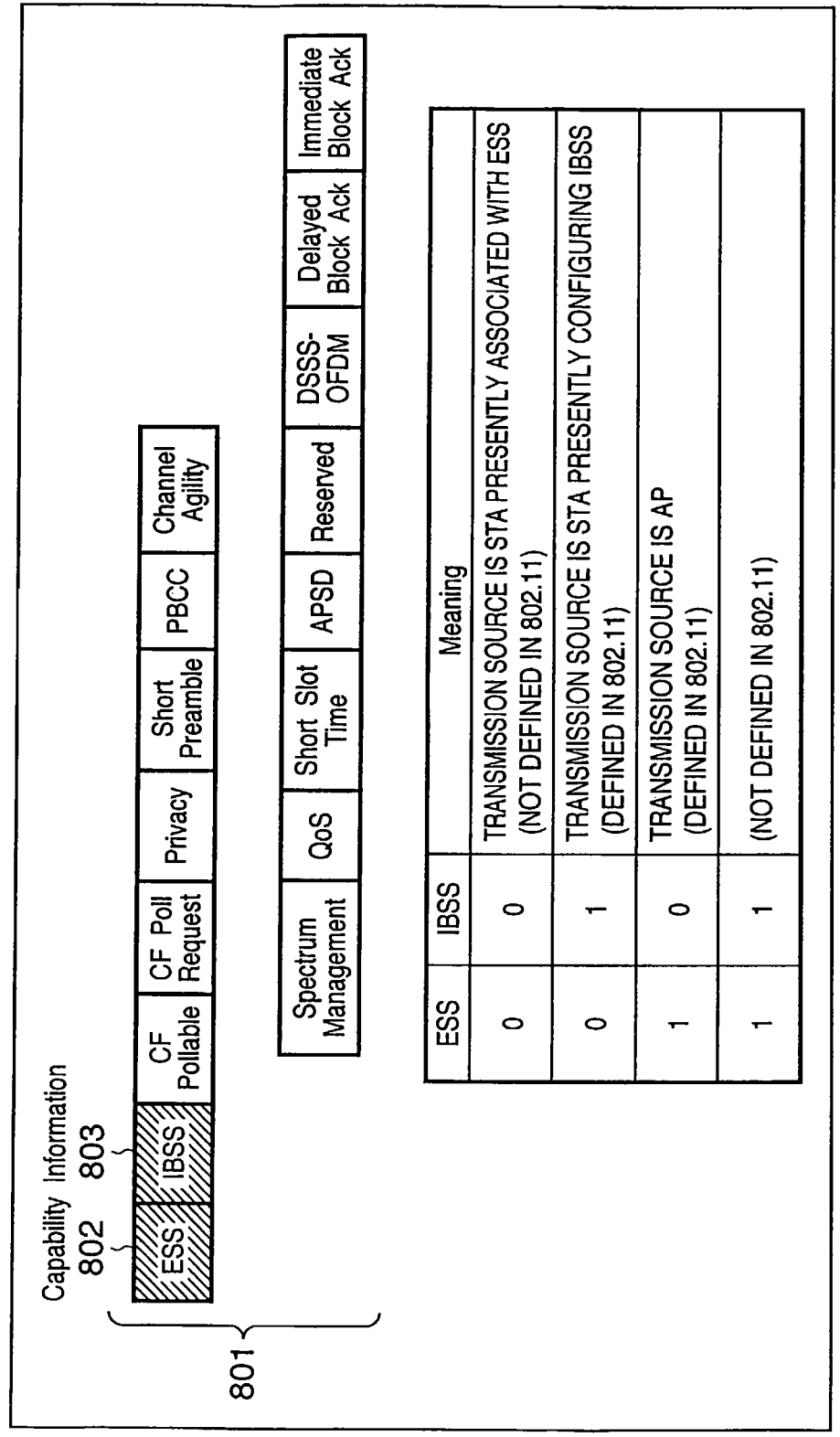
FIG. 8 is a diagram showing contents of capability information, and bit coding of ESS and IBSS fields.

Next, contents of a capability information field 709 included in the frame body field 707 in the case of a probe response will now be described with reference to FIG. 8. FIG. 8 is a diagram showing contents of capability information, which are parameters of a probe response frame, and bit Coding of ESS and IBSS fields. Various information, such as whether PCF (Point Coordination Function) will be performed or whether encoding will be performed and the like, are described in the capability information field of the probe response.

In FIG. 8, reference numeral 801 denotes contents of capability information which are parameters of a probe response frame. As shown in FIG. 8, a 1-bit ESS field 802 and a 1-bit IBSS field 803 are included in the capability information field.

According to IEEE 802.11e/D12, an ESS bit value of "1" signifies that the transmission source is an access point. In addition, an IBSS bit value of "1" signifies that the transmission source is a wireless terminal (station) which forms an ad hoc network other words, values of ESS:1 and IBSS:0 indicate that the transmission source is an access point, while values of ESS:0 and IBSS:1 indicate that the transmission source is a wireless terminal (station) which forms an ad hoc network (which is transmitting a beacon). Cases for ESS:0 and IBSS:0, as well as ESS:1 and IBSS:1 are not defined in IEEE 802.11e/D12.

In the present embodiment, ESS:0 and IBSS:0 will signify that the transmission source is a wireless terminal (station) currently associated with the ESS. In other words, ESS:0 and IBSS:0 possess functions as information which indicate that DLS communication is possible. Such defining is independently carried out by QSTA1 to QSTA3, and will not have an effect on the processing of QAP4. Therefore, the QAP4 according to the present embodiment may be configured using an existing access point apparatus. The case of ESS:1 and IBSS:1 will not be used in the present embodiment as well.

<Media Distribution Processing>

Operations of, each wireless terminal when distribution of AV stream data is commenced from QSTA2 (media server) or QSTA3 (media server) to QSTA1 (media renderer) will now be described with reference to FIGS. 4 and 9 to 12.

Figure 4:
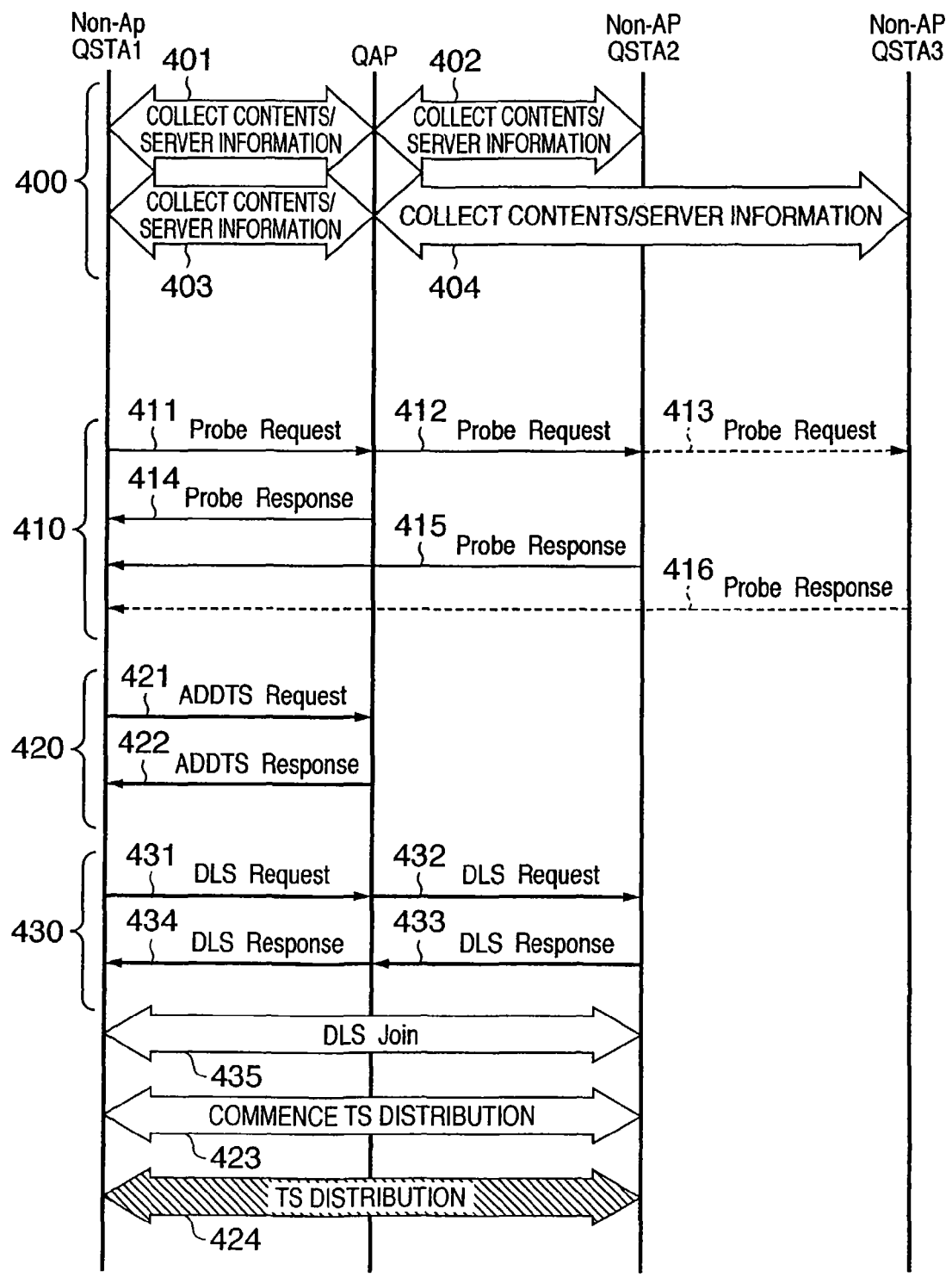
FIG. 4 is a sequence chart showing processing for setting a communication channel between wireless terminals using direct links.
Figure 9:
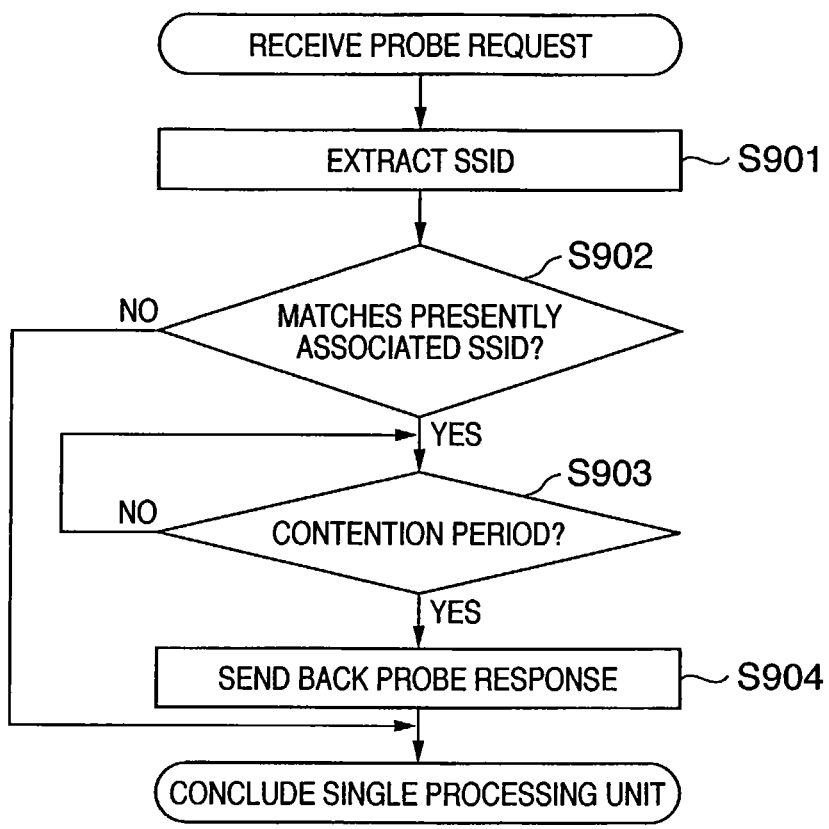
FIG. 9 is a flowchart showing a flow of processing executed when a media server receives a probe request signal.
Figure 10:
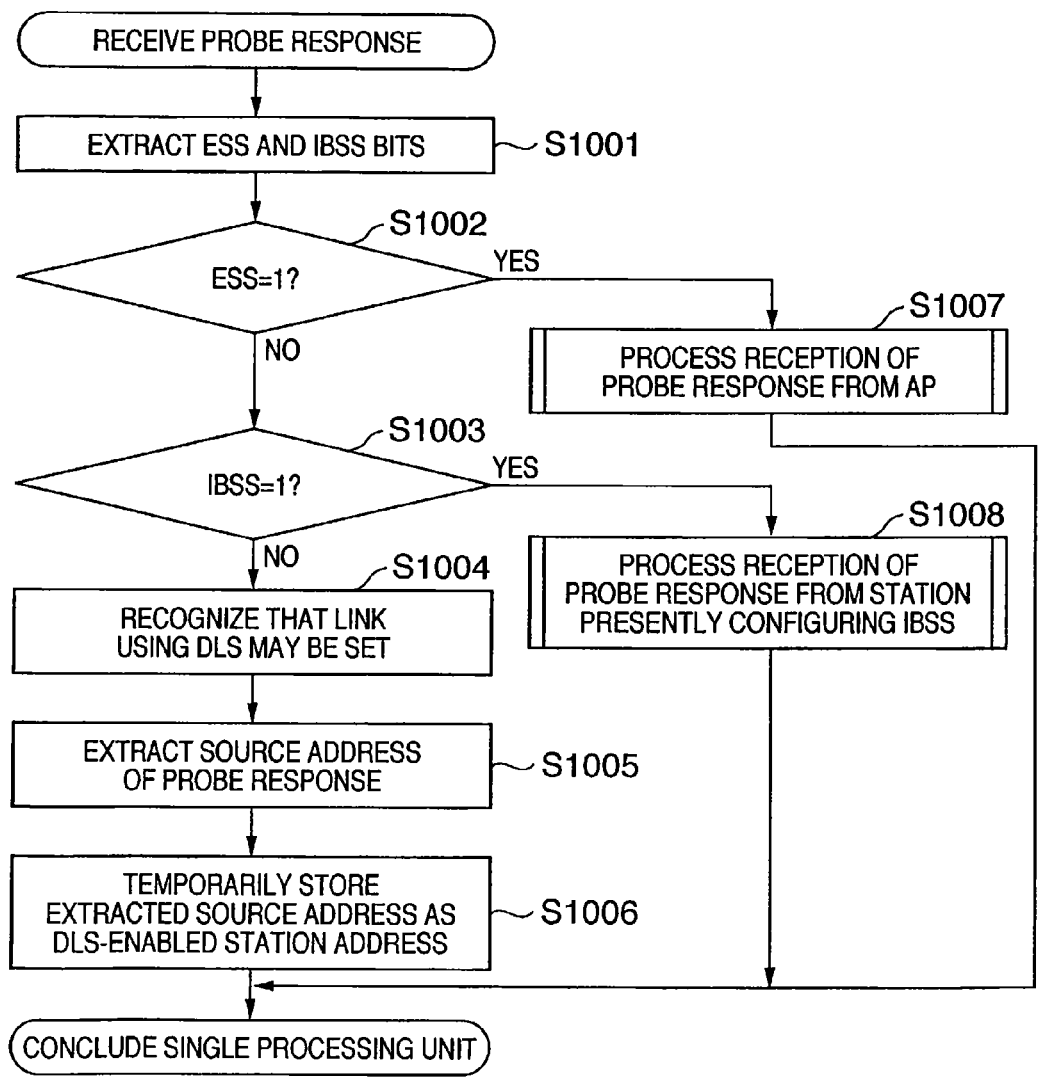
FIG. 10 is a flowchart showing a flow of processing executed when a media renderer receives a probe response signal.
Figure 11:
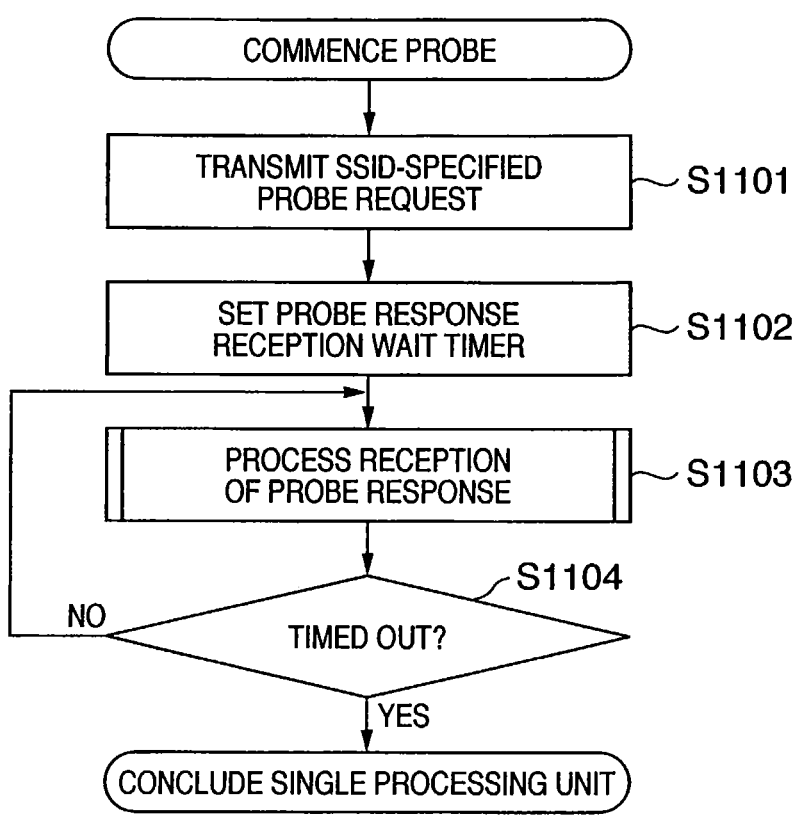
FIG. 11 is a flowchart showing a flow of probe processing executed by the media renderer.
Figure 12:
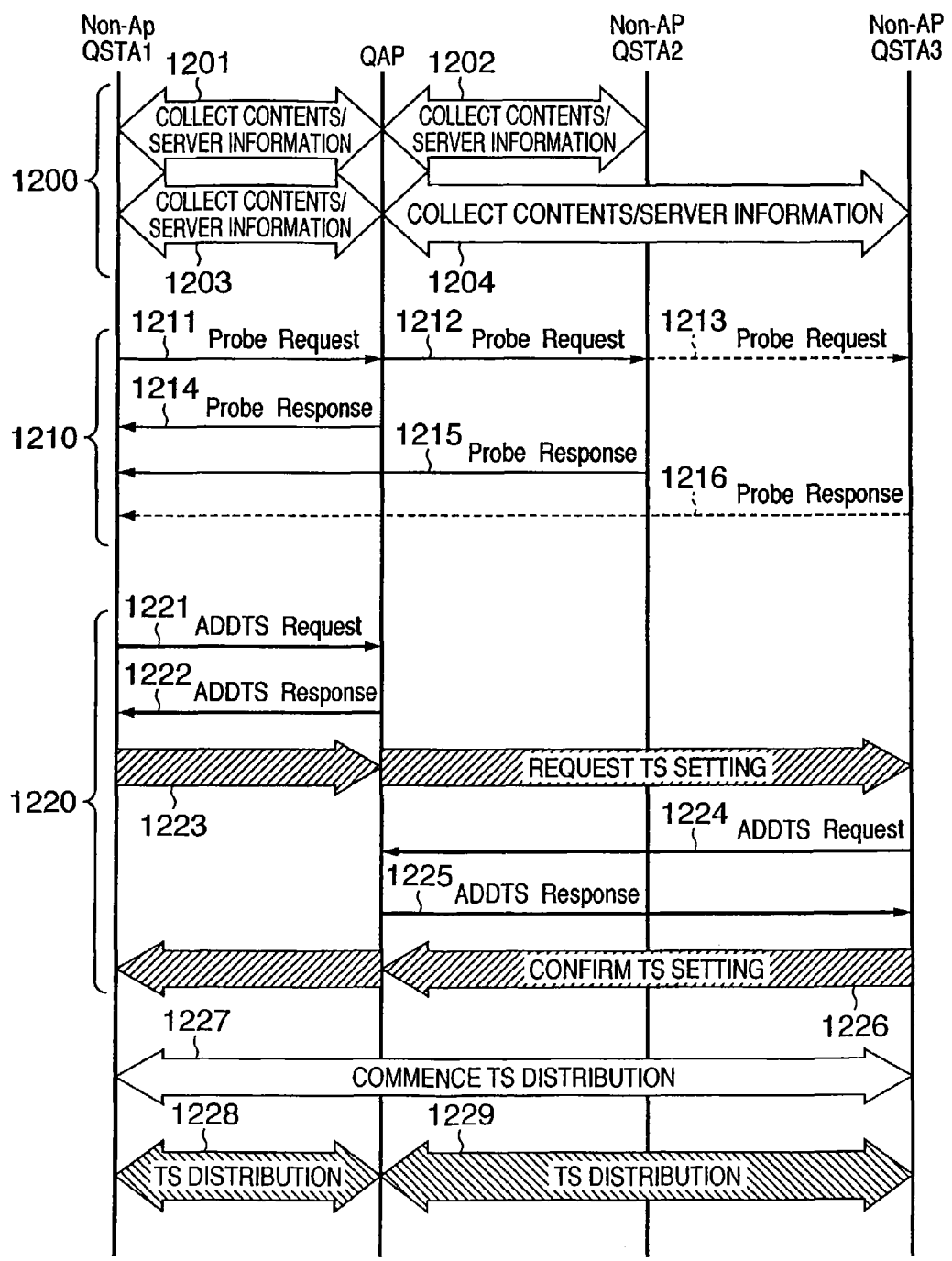
FIG. 12 is a sequence chart showing processing for setting a communication channel using an indirect link via an access point.

FIG. 4 is a sequence chart showing, processing for setting a communication channel between wireless terminals using direct links. FIG. 9 is a flowchart showing a flow of processing executed when media servers 2 and 3 receive a probe request signal. FIG. 10 is a flowchart showing a flow of processing executed when the media renderer 1 receives a probe response signal. FIG. 11 is a flowchart showing a flow of probe processing executed by the media renderer 1. FIG. 12 is a sequence chart showing processing for setting a communication channel using an indirect link via an access point.

For the following processing, it is assumed that the wireless terminals QSTA1 to QSTA3 are respectively associated (linked) with QAP4. In other words, a wireless communication channel, via the wireless access point QAP4, for normal data communication is set between the wireless terminals QSTA1 to QSTA3. In this state, QSTA1 performs a media distribution request to QSTA2 or QSTA3.

QSTA1 first collects (401 to 404, 1201 to 1204) information regarding each media server QSTA2 and QSTA3 and information of contents stored in these servers via the wireless communication channel via the wireless access point QAP4. Information of contents includes, for instance, identifiers, titles or bit rates and the like of the contents. QSTA1 hereby recognizes (400, 1200) contents which may be provided by QSTA2 and QSTA3. In addition, through this processing, the media renderer terminal QSTA1 recognizes device identification data (in the present embodiment, MAC addresses) of media server terminals (QSTA2 and QSTA3) which are objects of setting of the wireless communication channel for stream data communication.

After collection of contents/server information as described above, the wireless terminal QSTA1 displays a list of accessible media servers and contents to be acquired or the like on the display unit 204. Subsequently, selection by the user of media servers, contents and the like is accepted via the list display. When QSTA2 is selected by the user as the media server terminal to be accessed, processing will be performed along a sequence shown in FIG. 4. When QSTA3 is selected, processing will be performed along a sequence shown in FIG. 12.

After recognizing (400, 1200) the above-described providable contents, the media renderer terminal QSTA1 commences processing for probing media server terminals according to the flowchart of FIG. 11.

First, in step S1101, the media renderer terminal QSTA1 transmits a probe request signal that is set with system identification data (SSID) of the service set to which the terminal belongs. This processing corresponds to reference numerals 411 to 413 in FIG. 4, and reference numerals 1211 to 1213 in FIG. 12. The probe request signal transmitted by QSTA1 may be received by apparatuses existing in the range of the wireless signal reachable area 6 of QSTA1. In other words, for instance, the probe request signals indicated by reference numerals 412 and 1212 are directly sent from QSTA1 to QSTA2 without going through the access point 4. In addition, reference numerals 413 and 1213, which are denoted in the drawings as dotted lines, indicate that the probe request does not reach QSTA3. Furthermore; reference numerals 411 to 413 or reference numerals 1211 to 1213 indicate propagation of identical signals. For instance, reference numerals 412 or 1212 indicate that the signal did not reach QSTA2 via QAP4, but were instead received directly from QSTA1.

In step S1102, QSTA1 sets a probe response reception wait timer. Until this timer times out, QSTA1 enters a reception wait state for a probe response signal (a response signal to a probe request signal).

On the other hand, the media server terminals commence processing of the flowchart of FIG. 9 in response to reception of the probe request signal. In the example of the present embodiment, each terminal is in a positional relationship as shown in FIG. 1. The media server terminal capable of receiving the probe request signal is QSTA2, which exists within the communicable range 6 of QSTA1. Therefore, in the example of the present embodiment, QSTA2 commences the processing described in the flowchart of FIG. 9 in response to reception of the probe request signal.

In step S901, QSTA2 extracts an SSID from the probe request signal.

In step S902, QSTA2 determines whether the SSID extracted in step S901 matches a SSID currently associated by QSTA2. If the SSIDs match (Yes in step S902), the process proceeds to step S903. If not (No in step S902), a single processing unit is concluded.

In step S903 and thereafter, processing for sending back a probe response signal is performed using a contention period. In other words, in step S903, determination is performed on whether it is currently a contention period. If it is a contention period (Yes in step S903), the process proceeds to step S904. If not (No in step S903), the process stands by for a contention period.

In step S904, a probe response signal to which ESS:0 and IBSS:0 are set, or in other words, a probe response signal signifying that the transmission source is a wireless terminal associated with the ESS is transmitted to QSTA1. This concludes a signal processing unit.

Description will, now return to the processing (FIG. 11) of the media renderer terminal QSTA1. QSTA1 waits for reception of a probe response signal until the reception wait timer set in step S1102 times out. Once the probe response signal is received, in step S1103, QSTA1 performs probe response reception processing. Details of this processing will be provided later. As seen, QSTA1 receives a probe response signal (415, 1215) from QSTA2, which exists within the communicable range 6 of QSTA1 and is currently associated with the Same SSID, in addition to a normal response signal (414, 1214) from QAP4. When the reception wait timer times out (Yes in step S1104), a single processing unit is concluded.

Next, probe response reception processing executed by QSTA1 in step S1103 upon reception of the probe response signal will be described with reference to FIG. 10.

First, in step S1001, each ESS and IBSS bit is extracted from the received probe response signal. Processing will be subsequently performed according to the value of each ESS and IBSS bit.

In step S1002, it is determined whether the ESS bit is set to 1. If the ESS bit is set to 1 (Yes in step S1002), the process proceeds to step S1007 to execute processing normally performed when a probe response signal is received from an access point. Since the relevant processing is well known, a description thereof will be omitted. After the processing of step S1007 is finished, processing of a single processing unit is concluded. On the other hand, if the ESS bit is not set to 1, or in other words, if the ESS bit is set to 0 (No in step S1002), the process proceeds to step S1003.

In step S1003, it is determined whether the IBSS bit is set to 1. If the IBSS bit is set to 1 (Yes in step S1003), the process proceeds to step S1008. In step S1008, processing normally performed when receiving a probe response signal from an ad hoc network-forming wireless terminal, or in other words, a terminal configuring an IBSS is executed. Since the relevant processing is well known, a description thereof will be omitted. After the processing of step S1008 is finished, processing of a single processing unit is concluded. On the other hand, if the IBSS bit is not set to 1; or in other words, if the IBSS bit is set to 0 (No in step S1003), the process proceeds to step S1004.

As described above, the process proceeds to step S1004 only when ESS:0 and IBSS:0 are set to the probe response signal. Therefore, QTSA1 determines that the received probe response signal has been transmitted from a wireless terminal currently associated with the system identification data of the same service set (SSID). In step S1104 and thereafter, processing for temporarily storing the address of the transmission source of the probe response signal as an address of a wireless terminal capable of using DLS is performed.

In step S1004, it is recognized that a link using DLS is settable with the transmission source wireless terminal (QSTA2) of the received probe response signal.

In step S1005, a source address 712 which is the address of the transmission source is extracted from the probe response signal.

In step S1006, the source address 712 extracted in step S1005 is temporarily stored in the DLS availability storage unit 206 as an address of a wireless terminal capable of using DLS. A single processing unit of probe response reception processing is hereby concluded.

As described above, by transmitting and receiving a probe request signal and a probe response signal, QSTA1 temporarily stores the address of a wireless terminal capable of DLS communication in the DLS availability storage unit 206. In the example of the present embodiment, the address of QSTA2, which exists within the wireless signal reachable range 6 of the media renderer terminal 1 is temporarily stored in the DLS availability storage unit 206. In contrast, the address of QSTA3, which exists outside the wireless signal reachable range 6 is not stored in the DLS availability storage unit 206.

When device identification data (MAC address or the like) of a media server terminal storing contents is temporarily stored in the DLS availability storage unit 206, QSTA1 performs processing for setting a wireless communication channel using DLS. On the other hand, if the device identification data is not temporarily stored, processing for setting a wireless communication channel for stream data communication using indirect link service is performed.

For instance, in the above-described example, the address of QSTA2 is temporarily stored in the DLS availability storage unit 206. Therefore, when receiving contents from QSTA2, QSTA1 first communicates with QAP4 to set (420 to 422) a TS (Traffic Stream) for performing DLS communication. QSTA1 communicates (431 to 434) with QSTA2 via QAP4, and sets (430) DLS to the MAC of QSTA2. Next, after performing processing of DLS join (435) and commencement of TS distribution (423), QSTA1 receives (424) stream media distribution through the TS.

On the other hand, in the case of receiving contents from QSTA3, processing for setting a wireless communication channel for stream data communication using indirect link service via QAP4 is performed (1220 to 1226). After performing processing for commencing (1227) TS distribution, stream media distribution through TS via QPA4 is received (1228 and 1229).

As described above, in the configuration according to the present embodiment, a wireless terminal which receives a probe request signal sends back as a response thereof a probe response signal which includes information indicating that the transmission source is a terminal currently associated by an ESS. Terminals capable of sending back such probe response signals are terminals capable of DLS communication with the transmission source terminal of the probe request signal. Therefore, the transmission source terminal of the probe request signal may detect terminals capable of DLS communication by analyzing received probe response signals to study the existence of information indicating that a terminal is currently associated by an ESS.

As apparent from above, since QAP4 is not directly involved in the detection of terminals capable of DLS communication, such processing may be realized by merely adding a function to the wireless terminal side. In addition, since receiving terminals of probe request signals only send back probe response signals when SSIDs match, it is now possible to prevent increase of communication traffic in the system due to transmission of unnecessary probe response signals.

While detection of terminals capable of DLS communication by transmitting and receiving probe request signals and probe response signals is performed in the above configuration after collecting contents/server information, the present invention is not limited to this configuration. In other words, collection of contents/server information may be performed after performing detection processing of terminals capable of DLS communication. As seen, in the configuration according to the present embodiment, it is no longer necessary to determine in advance a wireless terminal which will become a communication party.

Additionally in the above example, while a case in which a media renderer terminal detects terminals capable of DLS communication, the present invention is not limited to this example. For instance, a media server terminal may be arranged to detect terminals capable of DLS communication.

Second Embodiment

For the first embodiment, description was given on processing performed in a case in which a single media renderer terminal and a plurality of media server terminals exist in a service set (SS) formed by QAP4, and the media renderer terminal searches for playable contents/servers. In the present embodiment, a plurality of media renderer terminals and a plurality of media server terminals exist in a service set (SS) formed by QAP4. In a state in which wireless communication resources are used by a media server terminal and a media renderer terminal of an existing combination, a separate media renderer terminal newly searches for playable contents/servers. In the present embodiment, information regarding the wireless communication resources in use in the relevant search is used and reflected onto the search results.

<System Configuration>

Figure 13:
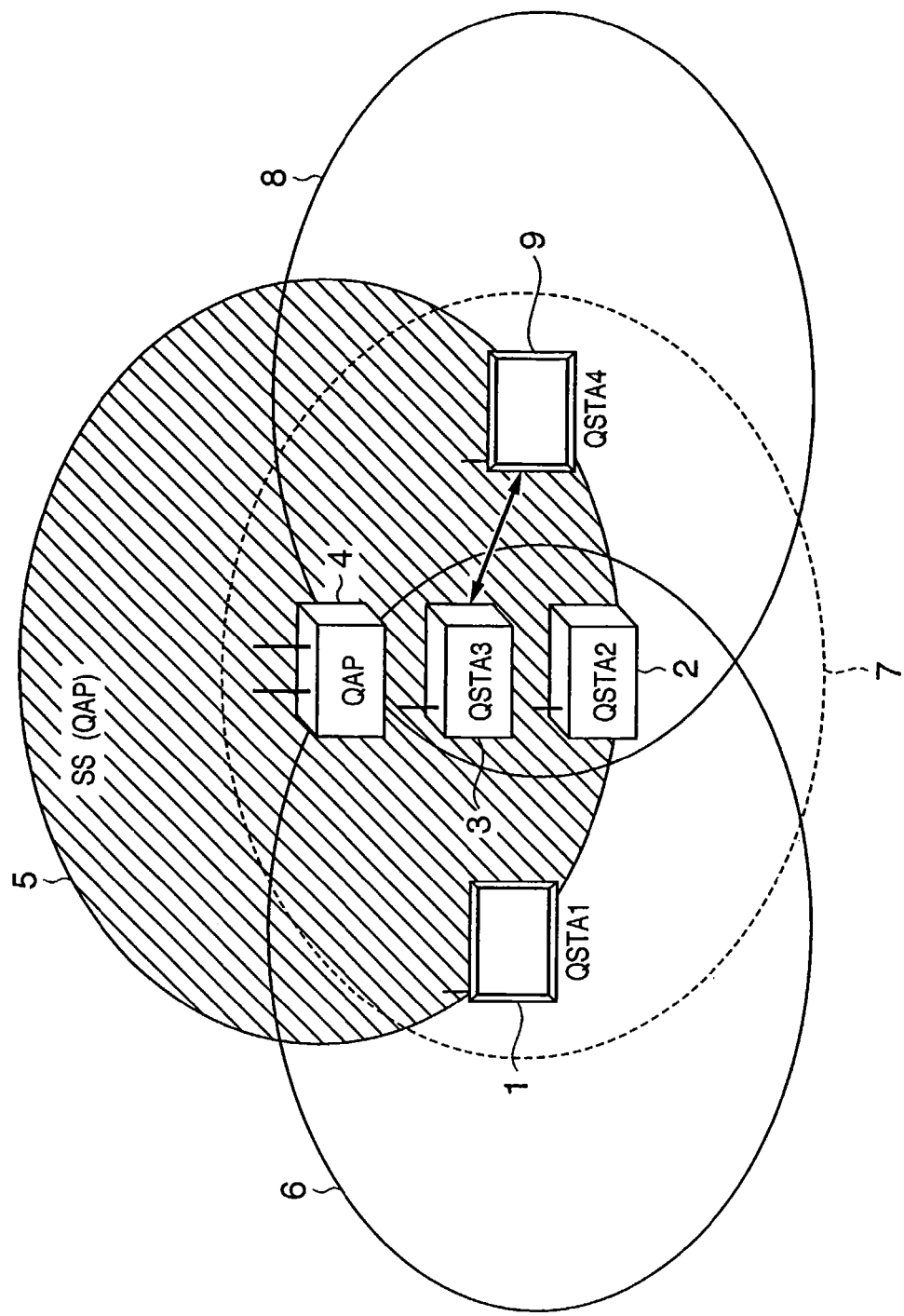
FIG. 13 is a diagram showing a system configuration according to a second embodiment.

FIG. 13 is a diagram showing a system configuration according to the present embodiment. Reference numerals 1 and 9 denote media renderer terminals (QSTA1, QSTA4), reference numerals 2 and 3 denote media server terminals (QSTA2, QSTA3), and reference numeral 4 denotes a wireless access point (QAP). In addition, reference numeral 5 denotes a service set (SS) formed by the wireless access point, reference numeral 6 denotes a wireless signal reachable area of the media renderer terminal QSTA 1, reference numeral 7 denotes wireless signal reachable areas of the media server terminals 2 and 3, while reference numeral 8 denotes a wireless signal reachable area of the media renderer terminal QSTA 2.

In the present embodiment, it is assumed that the wireless terminals exist in positions in which setting of DLS between QSTA1 and QSTA2, between QSTA1 and QSTA3, between QSTA2 and QSTA4, and between QSTA3 and QSTA4 is possible, while DLS setting between QSTA1 and QSTA4 is not. In addition, it is assumed that AV (Audio, Video) stream data is distributed (SD (Standard Density) images) between QSTA3 and QSTA4 using DLS.

The communication capacities of QSTA2 and QSTA3 are sufficient for simultaneously distributing SD images to a plurality of wireless terminals. However, it is assumed that the communication capacities only allow distribution of HD (High Density) images to one wireless terminal in a state where no other communication of media data and the like is performed. Therefore, the remaining communication capacity of QSTA3 allows SD images to be additionally distributed to another terminal, but does not allow HD images to be further distributed to another terminal. In addition, since the respective configurations of the terminals are similar to those of the first embodiment, descriptions thereof will be omitted.

<Frame Format>

Figure 14:
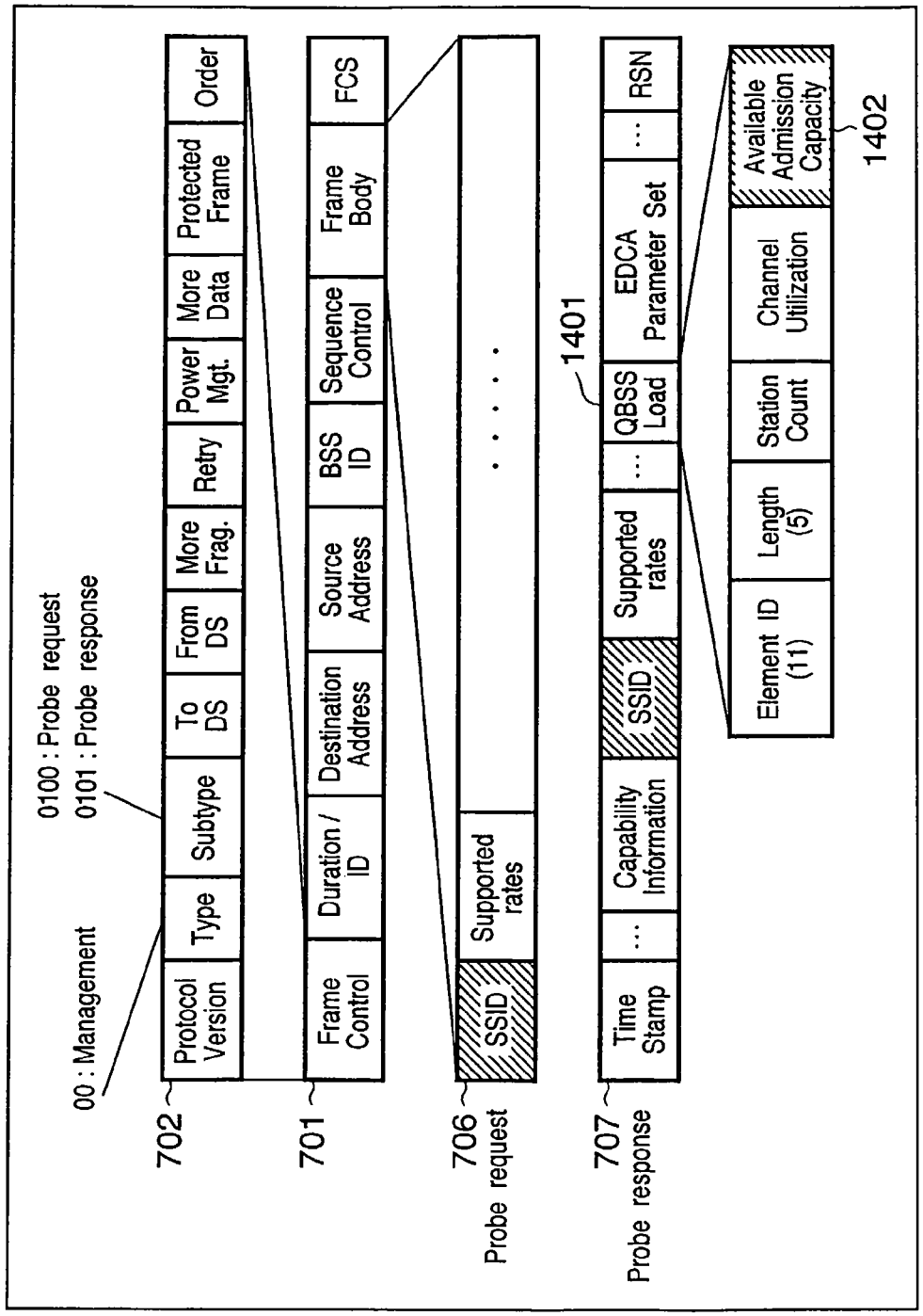
FIG. 14 is a diagram showing details of QBSS load information elements in frame formats of probe requests and probe responses defined by IEEE 802.11e/D12.

In a configuration according to the present embodiment, the value of an available admission capacity field of the QBSS load field included in a probe response signal will be used. These fields will now be described with reference to FIG. 14. FIG. 14 is a diagram showing details of QBSS load information elements in frame formats of probe requests and probe responses defined by IEEE 802.11e/D12.

In FIG. 14, reference numeral 1401 denotes a QBSS load field which includes an available admission capacity field 1402. Portions attached with like reference numerals as in FIG. 7 indicate like components, and descriptions thereof will be omitted.

When the transmission source is a base station or a wireless terminal forming an ad hoc network, a parameter indicating media remaining quantity, or in other words, remaining communication capacity is notified as the information element of "available admission capacity". A media remaining quantity may be used for communication control as an indication of wireless communication resource quantity usable in a service set formed by each terminal. Therefore, in the present embodiment, "available admission capacity" is used to notify a media remaining quantity usable by a wireless terminal when transmitting a probe response signal (when the transmission source is a wireless terminal). Information such as transferable bit rates may be used instead of, or in combination with, "available admission capacity".

<Media Distribution Processing>

Next, operations of, each wireless terminal when searching for playable contents/servers between QSTA2 (media server) or QSTA3 (media server) and QSTA1 (media renderer) will now be described with reference to FIGS. 15 to 17.

Figure 15:
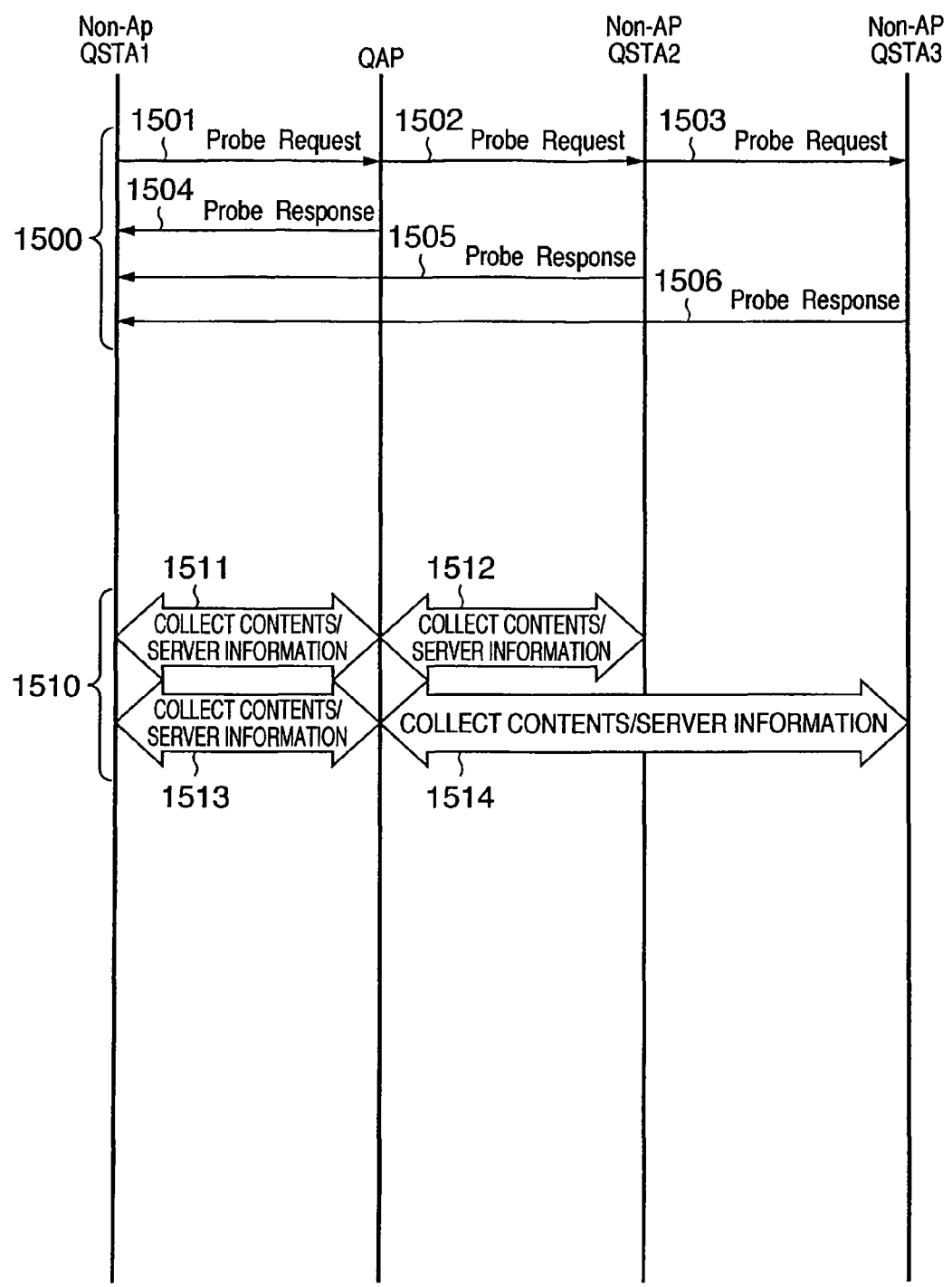
FIG. 15 is a sequence chart showing processing for searching playable contents/servers.
Figure 16:
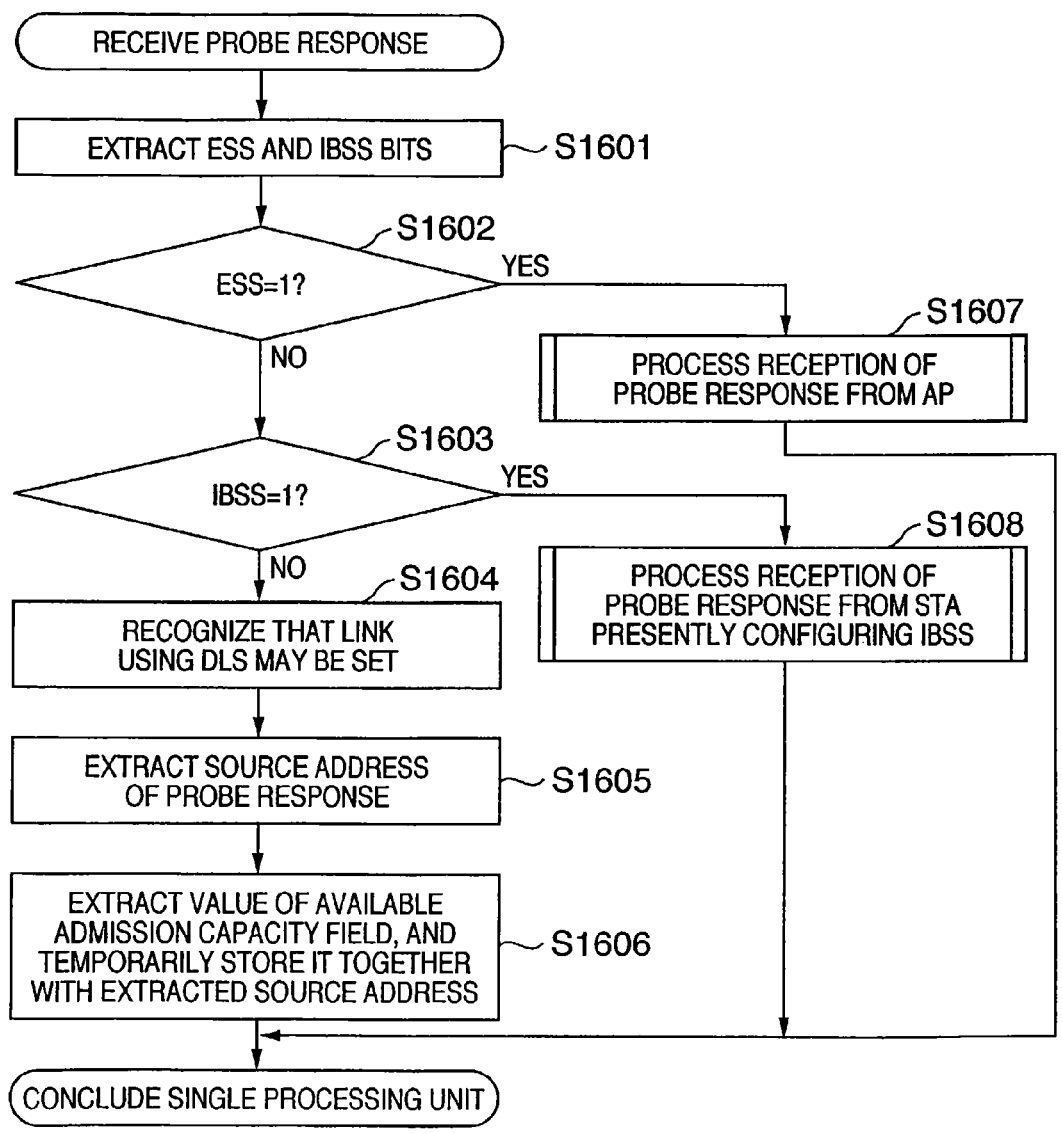
FIG. 16 is a flowchart showing a flow of processing executed when a media renderer receives a probe response signal.

FIG. 15 is a sequence chart showing processing for searching playable contents/servers. FIG. 16 is a flowchart showing a flow of processing executed when the media renderer 1 receives a probe response signal. FIG. 17 is a diagram typically showing a display example of the search results on a display. In addition, probe request reception processing and probe processing will be described with reference to FIGS. 9 and 11.

In the present embodiment, processing for collecting contents/server information is performed after transmitting and receiving probe request signals and probe response signals.

First, in step S1101, the media renderer terminal QSTA1 transmits a probe request signal that is set with system identification data (SSID) of the service set to which the terminal belongs to all terminals and access points or the like within the radio wave reachable range of the media renderer terminal QSTA1. This processing corresponds to reference numerals 1501 to 1503 in FIG. 15. The probe request signal transmitted by QSTA1 may be received by apparatuses existing in the range of the wireless signal reachable area 6 of QSTA1, or in other words, by access point 4 and QSTA2, QSTA3. Reference numerals 1501 to 1503 indicate propagation of a same signal. For instance, reference numeral 1502 indicates that the signal did not reach QSTA2 via QAP4, but was instead received directly from QSTA1.

In step S1102, QSTA1 sets a probe response reception wait timer. Until the timer times out, QSTA1 enters a reception wait state for a probe response signal (a response signal to a probe request signal).

On the other hand, in the same manner as in the first embodiment, the media server terminals commence the processing of the flowchart of FIG. 9 in response to reception of the probe request signal. In the example of the present embodiment, each terminal is in a positional relationship indicated in FIG. 13, and the media server terminals capable of receiving probe request signals are QSTA2 and QSTA3. Therefore, in the example of the present embodiment, QSTA2 and QSTA3 commence the processing described in the flowchart of FIG. 9 in response to reception of the probe request signal.

In step S901, QSTA2 and QSTA3 extract an SSID from the probe request signal.

In step S902, QSTA2 and QSTA3 determine whether the SSID extracted in step S901 matches a SSID currently associated by QSTA2 and QSTA3. If the SSIDs match (Yes in step S902), the process proceeds to step S903. If not (No in step S902), a single processing unit is concluded.

In step S903 and thereafter, processing for sending back a probe response signal using a contention period is performed. In other words, in step S903, determination is performed on whether it is currently a contention period. If it is a contention period (Yes in step S903), the process proceeds to step S904. If not (No in step S903), the process stands by for a contention period.

In step S904, a probe response signal is generated and transmitted to QSTA1. When generating a probe response signal, ESS:0 and IBSS:0, or in other words, information signifying that the transmission source is a wireless terminal associated with an ESS is set to the probe response signal. In addition, information regarding "available admission capacity", which is a parameter indicating a remaining communication capacity of a transmission source, is set to the probe response signal. Other necessary information is also set to generate the probe response signal, which is transmitted to QSTA1. A signal processing unit is thereby concluded.

Description will now return to the processing (FIG. 11) of the media renderer terminal QSTA1. QSTA1 waits for reception of a probe response signal until the response wait timer set in step S1102 times out. Once the probe response signal is received, in step S1103, QSTA1 performs probe response reception processing. Details of this processing will be provided later. As seen, QSTA1 receives a probe response signal (1505, 1506) from QSTA2 and QSTA3, which exists within the communicable range 6 of QSTA1 and is currently associated with the same SSID, in addition to a normal response signal (1504) from the QAP. When the reception wait timer times out (Yes in step S1104), a single processing unit is concluded.

Next, probe response reception processing executed by QSTA1 in step S1103 upon reception of the probe response signal will be described with reference to FIG. 16. FIG. 16 is a flowchart indicating a flow of probe response reception processing.

First, in step S1601, each ESS and IBSS bit is extracted from the received probe response signal. Processing will be subsequently performed according to the value of each ESS and IBSS bit.

In step S1602, it is determined whether the ESS bit is set to 1. If the ESS bit is set to 1 (Yes in step S1602), the process proceeds to step S1607 to execute processing, normally performed when a probe response signal is received from an access point. Since the relevant processing is well known, a description thereof will be omitted. After the processing of step S1607 is finished, processing of a single processing unit is concluded. On the other hand, if the ESS bit is not set to 1, or in other words, if the ESS bit is set to 0 (No in step S1602), the process proceeds to step S1603.

In step S1603, it is determined whether the IBSS bit is set to 1. If the IBSS bit is set to 1 (Yes in step S1603), the process proceeds to step S1608. In step S1608, processing normally performed when receiving a probe response signal from an ad hoc network-forming wireless terminal, or in other words, a terminal configuring an IBSS is executed. Since the relevant processing is well known, a description thereof will be omitted. After the processing of step S1608 is finished, processing of a single processing unit is concluded. On the other hand, if the IBSS bit is not set to 1, or in other words, if the IBSS bit is set to 0 (No in step S1603), the process proceeds to step S1604.

As described above, the process proceeds to step S1604 only when ESS:0 and IBSS:0 are set to the probe response signal. Therefore, QTSA1 determines that the received probe response signal has been transmitted from a wireless terminal currently associated with the system identification data of the same service set (SSID). In step S1104 and thereafter, processing for temporarily storing the address of the transmission source of the probe response signal as an address of a wireless terminal capable of using DLS is performed.

In step S1604, it is recognized that a link using DLS is settable between transmission source wireless terminals (QSTA2, QSTA3) of the received probe response signal.

In step S1605, a source address 712 which is the address of the transmission source is extracted from the probe response signal.

In step S1606, the source address 712 extracted in step S1605 is temporarily stored in the DLS availability storage unit 206 as an address of a wireless terminal capable of using DLS. In addition, the value of "available admission capacity" 1402 is extracted from the probe response signal, and is associated with the source address 712 to be temporarily stored in the DLS availability storage unit 206. A single processing unit of probe response reception processing is hereby concluded.

As described above, by transmitting and receiving a probe request signal and a probe response signal, QSTA1 acquires the address and media remaining quantity of a wireless terminal capable of DLS communication, and temporarily stores the acquired information in the DLS availability storage unit 206. This enables prior detection (1500) of a media remaining quantity for each wireless terminal.

After the above-described processing, QSTA1 collects (1511 to 1514) information regarding each media server QSTA2 and QSTA3 and information of contents stored in these servers via the wireless communication channel for normal data communication via the wireless access point QAP4. Information of contents includes, for instance, identifiers, titles or bit rates and the like of the contents. QSTA1 hereby acquires (1510) contents providable by QSTA2 and QSTA3, and information such as bit rates and the like of the contents.

After collection of contents/server information as described above, the wireless terminal QSTA1 displays a list of accessible media servers and contents to be acquired or the like on the display unit 204. In the present embodiment, display contents are controlled based on a remaining media quantity stored in the DLS availability storage unit 206.

In other words, QSTA1 references the value of "available admission capacity" stored in the DLS availability storage unit 206, and recognizes a remaining communication capacity providable by each media server. Based on a comparison of a recognized communication capacity and a bit rate of a content, list display is provided in which information indicating an incapability of distribution is added to contents with bit rates not providable by media server terminals. For instance, in the example of the present invention, QSTA2 is capable of distributing HD images, while QSTA3 is capable of further distributing SD images but not further HD images. Information which enables a user to understand this state will be displayed on the display unit 204.

Figure 17:
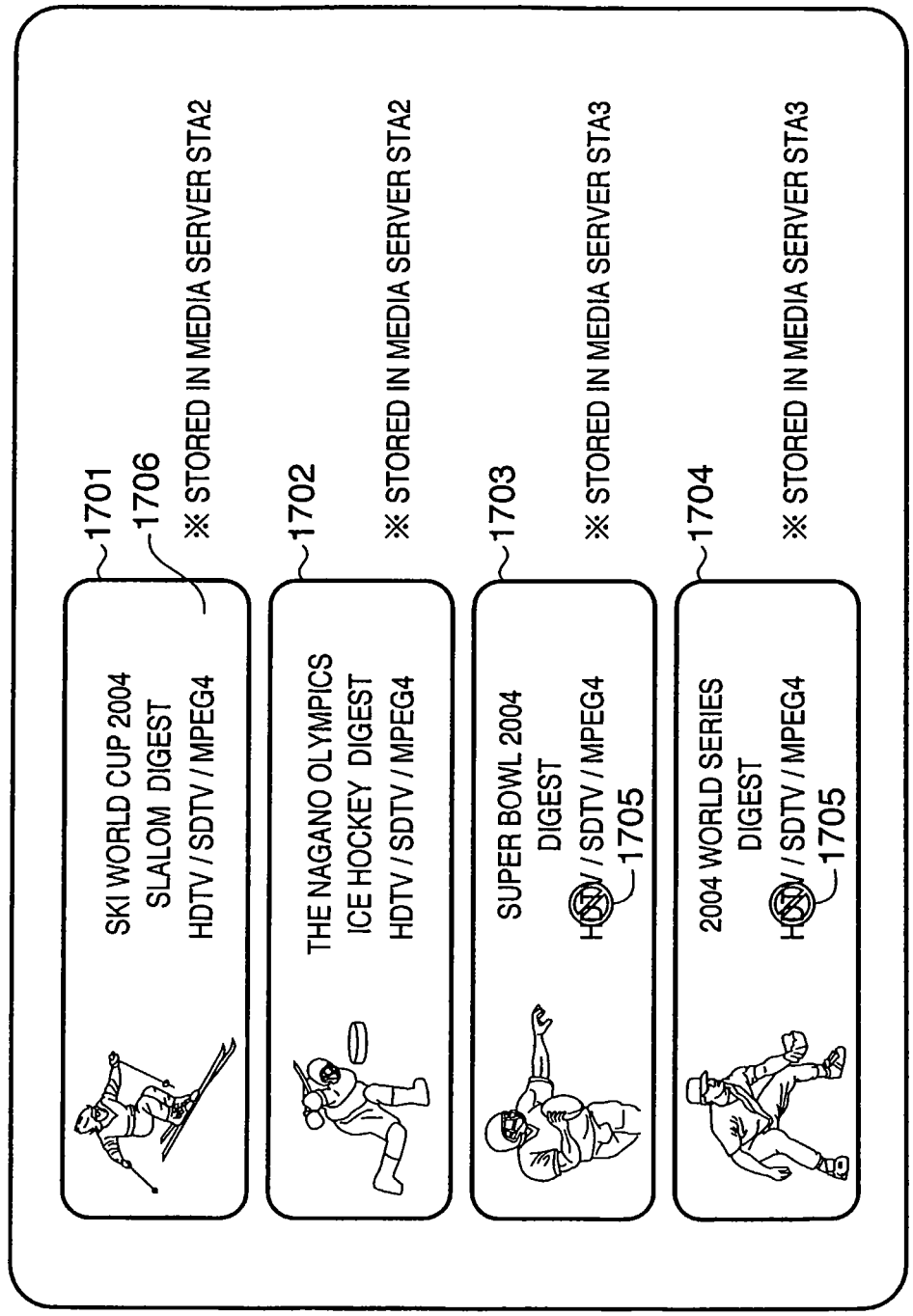
FIG. 17 is a diagram typically showing a display example of search results on a display.

FIG. 17 is a diagram exemplifying a list display of media servers, contents and the like. In FIG. 17, reference numerals 1701 to 1704 denote areas for list-displaying information on contents distributable to QSTA1. However, reference numerals 1701 and 1702 denote information on contents to be distributed by QSTA2, while reference numerals 1703 and 1704 denote information on Contents to be distributed by QSTA3. As represented by reference numeral 1706, each media server terminal retains HD, SD, and MPEG4 format data on the same content. Reference numeral 1705 denotes an icon indicating that HD contents may not be distributed. Displaying of the icon 1705 is controlled by QSTA1 based on the "available admission capacity value". This icon enables a user to easily understand which contents are not distributable.

As described above, in the configuration according to the present embodiment, a wireless terminal which receives a probe request signal sends back as a response thereof a probe response signal which includes information indicating remaining communication capacity of the terminal. Therefore, the transmission source terminal of the probe request signal is not only able to detect terminals capable of DLS communication by analyzing received probe response signals, but may also acquire information indicating a remaining communication capacity of the terminal. Thus, with a configuration according to the present invention, information indicating communication capacities may be reflected on, for instance, a list display of distributable contents, in addition to the effects of a configuration according to the first embodiment.

Third Embodiment

In the present embodiment, processing will be described in which settings of a communication channel for stream data communication is automatically switched from indirect link to direct link in accordance with a movement of a media renderer terminal. More specifically, a movement of a media renderer terminal, at which a communication channel for stream data communication is set by an indirect link, to a position where setting of a communication channel for stream data communication by a direct link is possible, is automatically detected. Processing for autonomously switching from an indirect link (infrastructure) to a direct link (DLS) will now be described.

<System Configuration>

Figure 18:
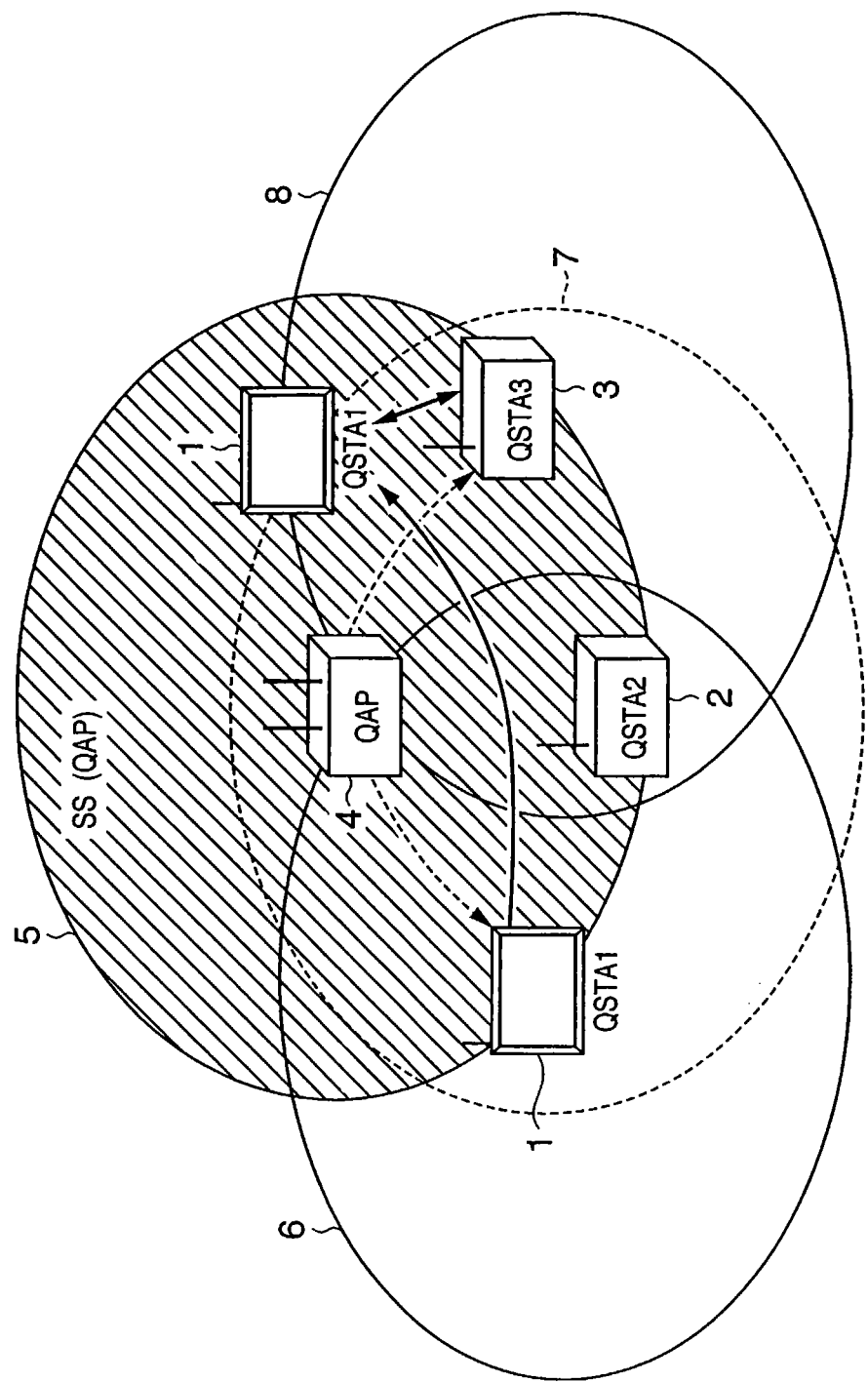
FIG. 18 is a diagram showing a system configuration according to a third embodiment.

FIG. 18 is a diagram showing a system configuration according to the present embodiment. Reference numeral 1 denotes a media renderer terminal (QSTA1), reference numerals 2 and 3 denote media server terminals (QSTA2; QSTA3), and reference numeral 4 denotes a wireless access point (QAP). In addition, reference numeral 5 denotes a service set (SS) formed by the wireless access point, reference numeral 6 denotes a wireless signal reachable area of the media renderer terminal QSTA1, while reference numerals 7 and 8 denote wireless signal reachable areas of the media server terminals 2 and 3. For the present configuration example, a case will be exemplified in which QSTA1 moves into the wireless signal reachable area 8 of the media server terminal QSTA3 in a state in which QSTA3 is receiving distribution of information from QSTA3 in an indirect link communication channel. It is assumed that the QSTA1, after movement, also exists within the wireless, signal reachable area 7 of the media server terminal QSTA2. In addition, since the respective configurations of the terminals are similar to those of the first embodiment, descriptions thereof will be omitted.

<Media Distribution Processing>

Figure 19:
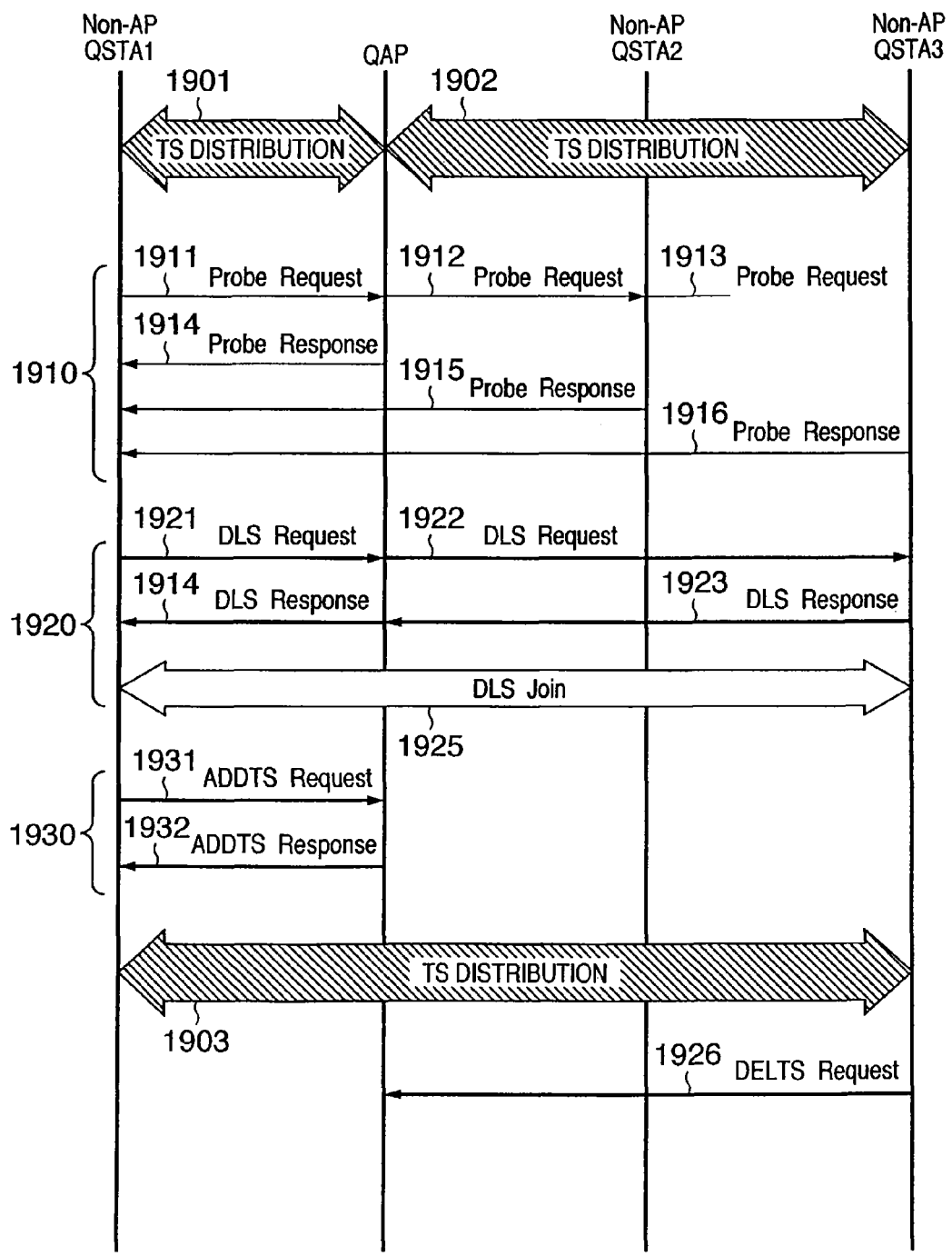
FIG. 19 is a sequence chart showing processing for switching communication channels for stream data communication.

Next, operation of each wireless terminal upon switching of Communication channels for stream data communication which accompanies the above-described movement will be described with reference to FIG. 19. FIG. 19 is a sequence chart showing processing for Switching communication channels for stream data communication. In addition, probe request reception processing, probe response reception processing and probe processing will be described with reference to FIGS. 9 to 11.

As indicated by reference numerals 1901 and 1902, the media renderer terminal QSTA1 receives stream data distributed from the media server terminal QSTA3 by an indirect link (infrastructure).

Next, triggered by detection of its own movement, the media renderer terminal QSTA1 commences probe processing of media server terminals. Detection of movement is performed, for instance, based on an observation of a fluctuation with a fluctuation margin greater or equal to a predetermined value in the link quality of a wireless link currently used by the indirect link. The wireless link quality includes, for instance, RSSI (Received Signal Strength Indicator) which indicates radio wave strength and the like. This is based on changes to the wireless link quality caused by changes in the positional relationship among devices (including access points) when a terminal moves during wireless communication. Alternatively, detection of movement may be arranged so that such detection is based on a continuation of a fluctuation with a fluctuation range which is greater or equal to a predetermined value for more than a predetermined period of time. In addition, detection of movement may be performed using a GPS or a predetermined acceleration detector and the like, or a combination thereof.

Probe processing for media server terminals performed by the media renderer terminal QSTA1 is performed based on the flowchart shown in FIG. 11, in the same manner as the configuration according to the first embodiment.

First, in step S1101, the media renderer terminal QSTA1 transmits a probe request signal that is set with system identification data (SSID) of the service set to which the terminal belongs to all terminals and access points or the like within the radio wave reachable range of the media renderer terminal QSTA1. This processing corresponds to reference numerals 1911 to 1913 in FIG. 19. The probe request signal transmitted by QSTA1 may be received by apparatuses existing in the range of the wireless signal reachable area 6 of QSTA1. Reference numerals 1901 to 1903 indicate propagation of a same signal. For instance, reference numeral 1902 indicates that the signal did not reach QSTA2 via QAP4, but was instead received directly from QSTA1.

In step S1102, QSTA1 sets a probe response reception wait timer. Until the timer times out, QSTA1 enters a reception wait state for a probe response signal (a response signal to a probe request signal).

On the other hand, the media server terminals commence the processing of the flowchart of FIG. 9 in response to reception of the probe request signal. In the example of the present embodiment, the QSTA1 after movement exists in both the wireless signal reachable area 7 of the media server terminal 2 and the wireless signal reachable area 8 of the media server terminal 3. Therefore, the media server terminals capable of receiving probe request signals are QSTA2 and QSTA3. Therefore, in the example of the present embodiment, QSTA2 and QSTA3 commence the processing described in the flowchart of FIG. 9 in response to reception of the probe request signal.

In step S901, QSTA2 and QSTA3 extract an SSID from the probe request signal.

In step S902, QSTA2 and QSTA3 determine whether the SSID extracted in step S901 matches a SSID currently associated by QSTA2 and QSTA3. If the SSIDs match (Yes in step S902); the process proceeds to step S903. If not (No in step S902), a single processing unit is concluded.

In step S903 and thereafter, processing for sending back a probe response signal using a contention period is performed. In other words, in step S903, determination is performed on whether it is currently a contention period. If it is a contention period (Yes in step S903), the process proceeds to step S904. If not (No in step S903), the process stands by for a contention period.

In step S904, a probe response signal to which ESS:0 and IBSS:0 are set, or in other words, a probe response signal signifying that the transmission source is a wireless terminal associated with the ESS is transmitted to QSTA1. A signal processing unit is thereby concluded.

Description will now return to the processing (FIG. 11) of the media renderer terminal QSTA1. QSTA1 waits for reception of a probe response signal until the reception wait timer set in step S1102 times out. Once the probe response signal is received, in step S1103, QSTA1 performs probe response reception processing. Details of this processing will be provided later. As seen, QSTA1 receives a probe response signal (1915, 1916) from QSTA2 and QSTA3, which exists within the communicable range 6 of QSTA1 and is currently associated with the same SSID, in addition to a normal response signal (1914) from the QAP. When the reception wait timer times out (Yes in step S1104), a single processing unit is concluded.

Next, probe response reception processing executed by QSTA1 in step S1103 upon reception of the probe response signal will be described with reference to FIG. 10.

First, in step S1001, each ESS and IBSS bit is extracted from the received probe response signal. Processing will be subsequently performed according to the value of each ESS and IBSS bit.

In step S1002, it is determined whether the ESS bit is set to 1. If the ESS bit is set to 1 (Yes in step S1002), the process proceeds to step S1007 to execute processing normally performed when a probe response signal is received from an access point. Since the relevant processing is well known, a description thereof will be omitted. After the processing of step S1007 is finished, processing of a single processing unit is concluded. On the other hand, if the ESS bit is not set to 1, or in other words, if the ESS bit is set to 0 (No in step S1002), the process proceeds to step S1003.

In step S1003, it is determined whether the IBSS bit is set to 1. If the IBSS bit is set to 1 (Yes in step S1003), the process proceeds to step S1008. In step S1008, processing normally performed when receiving a probe response signal from an ad hoc network-forming wireless terminal, or in other words, a terminal configuring an IBSS, is executed. Since the relevant processing is well known, a description thereof will be omitted. After the processing of step S1008 is finished, processing of a single processing unit is concluded. On the other hand, if the IBSS bit is not set to 1, or in other words, if the IBSS bit is set to 0 (No in step S1003), the process proceeds to step S1004.

As described above, the process proceeds to step S1004 only when ESS:0 and IBSS:0 are set to the probe response signal. Therefore, QTSA1 determines that the received probe response signal has been transmitted from a wireless terminal currently associated with the system identification data of the same service set (SSID). In step S1104 and thereafter, processing for temporarily storing the address of the transmission source of the probe response signal as an address of a wireless terminal capable of using DLS is performed.

In step S1004, it is recognized that a link using DLS is settable between transmission source wireless terminals (QSTA2, QSTA3) of the received probe response signal.

In step S1005, a source address 712 which is the address of the transmission source is extracted from the probe response signal.

In step S1006, the source address 712 extracted in step S1005 is temporarily stored in the DLS availability storage unit 206 as an address of a wireless terminal capable of using DLS. A single processing unit of probe response reception processing is hereby concluded.

After processing such as described above, if device identification data (MAC address or the like) of QTSA3 is temporarily stored in the DLS availability storage unit 206 as the address of a wireless terminal capable of using DLS, re-setting processing of a communication channel for stream data communication using DLS is performed. In other words, QSTA1 first communicates (1921 to 1924) with QSTA3 via QAP4, and sets (1920) DLS to the MAC of QSTA3. Next, QSTA1 communicates with QAP4 to set (1930 to 1932) a TS (Traffic Stream) for performing DLS communication. Subsequently, through direct communication with QSTA3, QSTA1 receives (1930) stream media distribution by the TS. Since the TS assigned to communication with the QAP becomes unnecessary due to switching to communication by DLS, QSTA3 requests (1926) the QAP to open the TS.

On the other hand, if device identification data (MAC address or the like) of QTSA3 is not temporarily stored in the DLS availability storage unit 206 as the address of a wireless terminal capable of using DLS, stream media distribution is continued through communication via the QAP4.

As described above, in the configuration according to the present embodiment, availability of a wireless direct link is detected by the same procedure as with the configurations according to the first and second embodiments even during communication of stream data. When it is detected that DLS communication is possible, communication for stream data distribution between wireless terminals is autonomously switched to communication using DLS, which uses less wireless resources. Therefore, with the configuration according to the present embodiment, it is now possible to use the limited wireless media resources in an efficient manner.

The present embodiment may be configured so that when switching communication channels, temporal positional information of media data distributed right up until the switching may be retained at any of the terminals, and distribution may be recommenced from the portion indicated by the positional information after switching communication channels. Such positional information will include frame numbers and playback time or the like of the media data. For instance, the present embodiment may, be configured so that a frame number of media distributed right up until the switching of communication channels is retained in a media server terminal, and distribution is recommenced after switching of communication channels from a frame following the retained frame number. By configuring the present embodiment in this manner, seamless communication may be achieved when switching communication channels without significantly compromising media playback quality.

In addition, while a configuration has been described above in which a predetermined event triggers switching from indirect communication to communication by DLS, a configuration in which switching is performed from communication by DLS to indirect communication is also possible using the same method. For instance, during stream data communication by DLS, movement of QSTA1 is detected using the same method as described above and the detection is used as a trigger to commence processing for detecting availability of a wireless direct link. When it is determined that a wireless direct link is difficult, processing for switching from communication by DLS to indirect communication is performed. By performing such processing, distribution of stream data may be continued without disconnection even when communication by DLS becomes unavailable due to movement of a terminal.

Fourth Embodiment

For the third embodiment, a configuration has been described in which link settings of a communication channel for stream data communication is automatically switched from indirect link to direct link in accordance with movement of a media renderer terminal. However, events which trigger switching of links are not limited to those based on movement of a media renderer terminal.

In the present embodiment, a state is envisioned in which a media server terminal and a media renderer terminal are respectively at positions which allow communication by DLS, but are nevertheless performing stream data distribution through communication by an indirect link via an access point (base station). In such a state, another media server (in the present embodiment, a camcorder), having a positional relationship with respect to the media renderer terminal which does not allow DLS, newly performs a request for setting of a communication channel for stream data communication using an indirect link via the base station. The media server terminal and the media renderer terminal, which have been performing stream data distribution using an indirect link, use the new setting request as a trigger to autonomously switch from communication by an indirect link to communication by DLS. In other words, for the present embodiment, a configuration will be described in which a request for setting of a communication channel for stream data communication from another media server terminal becomes an event for triggering switching of links.

<System Configuration>

Figure 20:
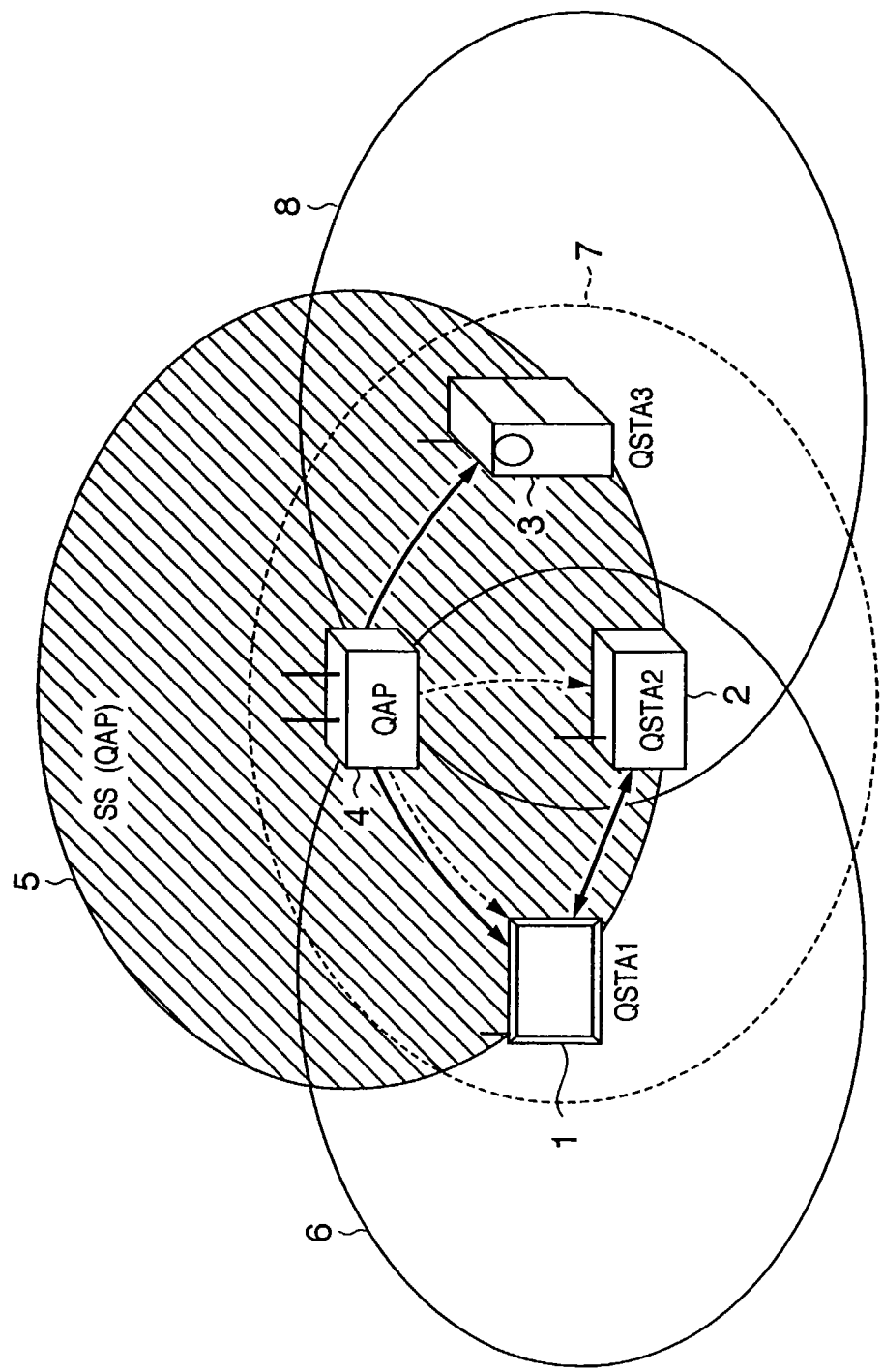
FIG. 20 is a diagram showing a system configuration according to a fourth embodiment.

FIG. 20 is a diagram showing a system configuration according to the present embodiment. Reference numeral 1 denotes a media renderer terminal (QSTA1), reference numerals 2 and 3 denote media server terminals (QSTA2, QSTA3), and reference numeral 4 denotes a wireless access point (QAP). In addition, reference numeral 5 denotes a service set (SS) formed by the wireless access point, reference numeral 6 denotes a wireless signal reachable area of the media renderer terminal QSTA1, while reference numerals 7 and 8 denote wireless signal reachable areas of the media server terminals 2 and 3. In the present configuration example, all QSTAs, or in other words, QSTA1 to QSTA3 exist in an area of the SS (Service Set) 5. In addition, it is assumed that the wireless terminals QSTA1 to QSTA3 respectively exist in positions in which setting of DLS between QSTA1 and QSTA2 as well as between QSTA2 and QSTA3 is possible, while DLS setting between QSTA1 and QSTA3 is not. Since the respective configurations of the terminals are similar to those of the first embodiment, descriptions thereof will be omitted.

<Media Distribution Processing>

Figure 21:
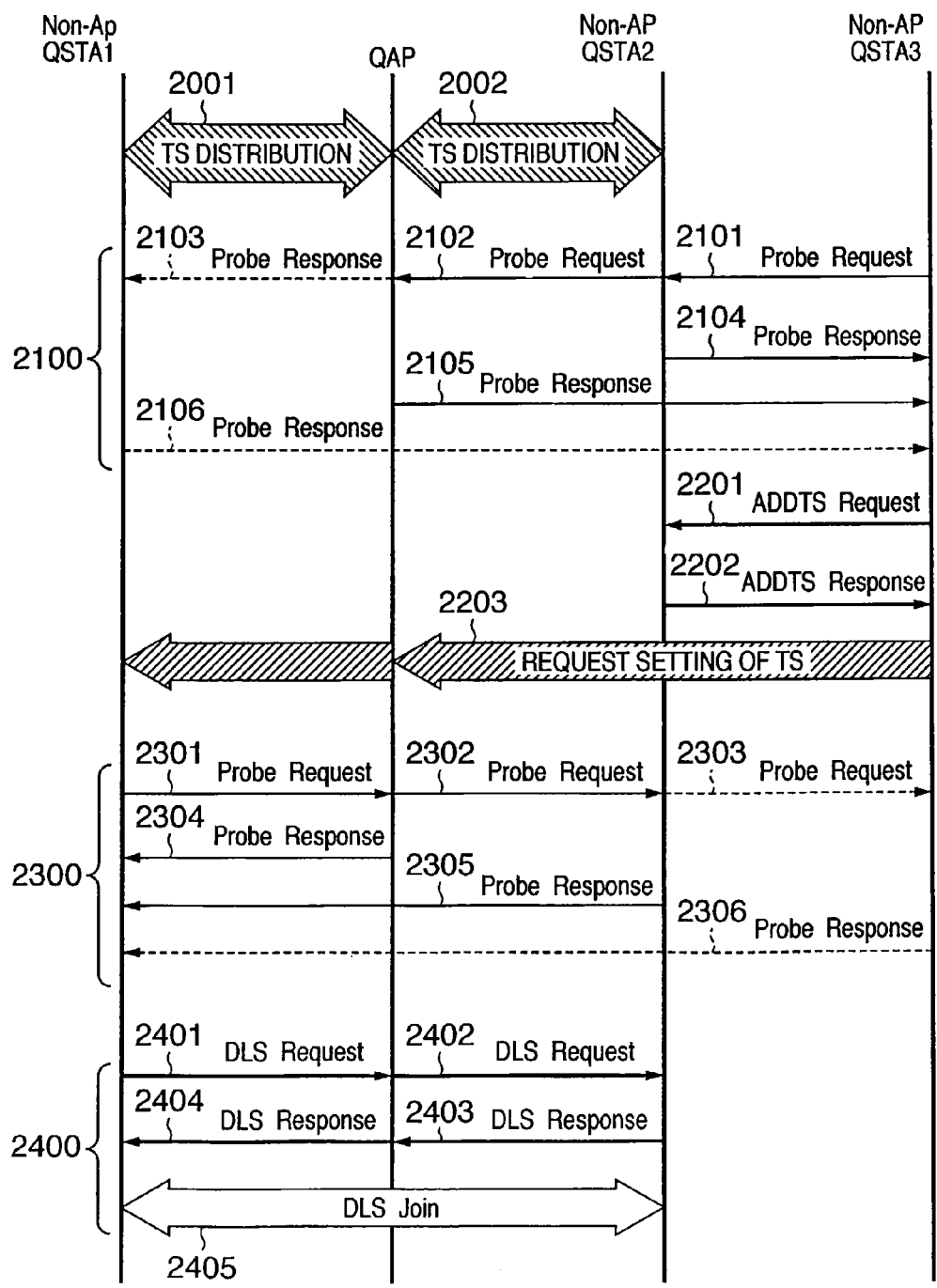
FIG. 21 is a sequence chart showing processing for switching communication channels for stream data communication.
Figure 22:
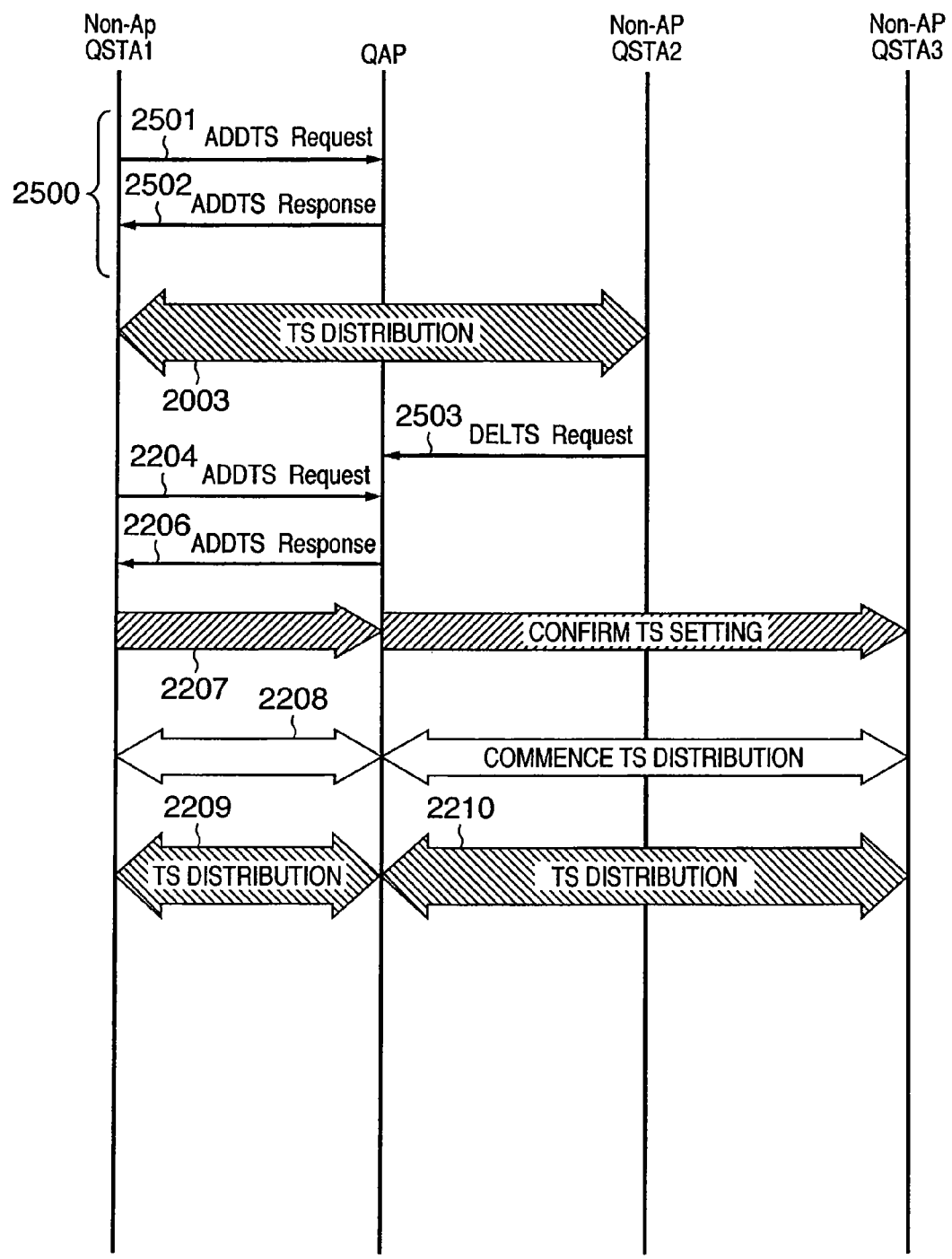
FIG. 22 is a sequence chart showing processing for switching communication channels for stream data communication.

Next, operations of each wireless terminal when switching of communication channels for stream data communication is performed between the media server terminals QSTA2, QSTA3 and the media renderer terminal QSTA1 will now be described with reference to FIGS. 21 and 22. FIG. 21 is a sequence chart showing processing for switching communication channels for stream data communication. FIG. 22 is a sequence chart showing processing for switching communication channels for stream data communication which is performed following the processing shown in FIG. 21. In addition, probe request reception processing, probe response reception processing and probe processing will be described with reference to FIGS. 9 to 11.

As indicated by reference numerals 2001 and 2002, the media renderer terminal QSTA1 receives stream data distributed from the media server terminal QSTA3 by an indirect link (infrastructure).

At this point, it is assumed that the media server (camcorder) terminal QSTA3 has activated processing for setting a communication channel for stream data communication in order to distribute recorded images from the terminal QSTA3 to the media renderer terminal QSTA1. This setting processing is executed in the same procedure as in the first embodiment. In other words, the media server terminal QSTA3 executes processing based on the flowchart of FIG. 11.

First, in step S1101, QSTA3 transmits a probe request signal that is set with system identification data of the service set to which the terminal belongs to all terminals and access points or the like within its own radio wave reachable range. This processing corresponds to reference numerals 2101 to 2103 in FIG. 21. The probe request signal transmitted by QSTA3 may be received by apparatuses existing in the range of the wireless signal reachable area 8 of QSTA3. Reference numerals 2101 to 2103 indicate propagation of a same signal. For instance, reference numeral 2102 indicates that the signal has been directly received from QSTA3. The same applies to reference numerals 2301 to 2303.

Next, in step S1102, QSTA3 sets a probe response reception wait timer. Until the timer times out, QSTA3 enters a reception wait state for a probe response signal (a response signal to a probe request signal).

On the other hand, apparatuses which have received the probe request signal commence the processing of the flowchart of FIG. 9 in response to reception of the probe request signal. In the example of the present embodiment, each terminal is in a positional relationship as shown in FIG. 20. The media server terminal capable of receiving the probe request signal is QSTA2, which exists within the communicable range 8 of QSTA3. Therefore, in the example of the present embodiment, QSTA2 commences the processing described in the flowchart of FIG. 9 in response to reception of the probe request signal.

In step S901, QSTA2 extracts an SSID, from the probe request signal.

In step S902, QSTA2 determines whether the SSID extracted in step S901 matches a SSID currently associated by QSTA2. If the SSIDs match (Yes in step S902), the process proceeds to step S903. If not (No in step S902), a single processing unit is concluded.

In step S903 and thereafter, processing for sending back a probe response signal using a contention period is performed. In other words, in step S903, determination is performed on whether it is currently a contention period. If it is a contention period (Yes in step S903), the process proceeds to step S904. If not (No in step S903), the process stands by for a contention period.

In step S904, a probe response signal to which ESS:0 and IBSS:0 are set, or in other words, a probe response signal signifying that the transmission source is a wireless terminal associated with the ESS is transmitted to QSTA1. A signal processing unit is thereby concluded.

As described above, the media server terminal sends back a probe response signal only when the SSID extracted in step S901 matches the SSID with which the terminal is currently associated. Therefore, increases in communication traffic due to unnecessary probe response signals may be prevented.

Description will now return to the processing (FIG. 11) of the media server terminal QSTA3. QSTA3 waits for reception of a probe response signal until the reception wait timer set in step S1102 times out. Once the probe response signal is received, in step S1103, QSTA3 performs probe response reception processing. Details of this processing will be provided later. As seen, QSTA3 receives a probe response signal (2104) from QSTA2, which exists within the communicable range 8 of QSTA3 and is currently associated with the same SSID, in addition to a normal response signal (2105) from the QAP. When the reception wait timer times out (Yes in step S1104), a single processing unit is concluded.

Next, probe response reception processing executed by QSTA3 in step S1103 upon reception of the probe response signal will be described with reference to FIG. 10.

First, in step S1001, each ESS and IBSS bit is extracted from the received probe response signal. Processing will be subsequently performed according to the value of each ESS and IBSS bit.

In step S1002, it is determined whether the ESS bit is set to 1. If the ESS bit is set to 1 (Yes in step S1002), the process proceeds to step S1007 to execute processing normally performed when a probe response signal is received from an access point. Since the relevant processing is well known, a description thereof will be omitted. After the processing of step S1007 is finished, processing of a single processing unit is concluded. On the other hand, if the ESS bit is not set to 1, or in other words, if the ESS bit is set to 0 (No in step S1002), the process proceeds to step S1003.

In step S1003, it is determined whether the IBSS bit is set to 1. If the IBSS bit is set to 1 (Yes in step S1003), the process proceeds to step S1008. In step S1008, processing normally performed when receiving a probe response signal from an ad hoc network-forming wireless terminal, or in other words, a terminal configuring an IBSS is executed. Since the relevant processing is well known, a description thereof will be omitted. After the processing of step S1008 is finished, processing of a single processing unit is concluded. On the other hand, if the IBSS bit is not set to 1, or in other words, if the IBSS bit is set to 0 (No in step S1003), the process proceeds to step S1004.

As described above, the process proceeds to step S1004 only when ESS:0 and IBSS:0 are set to the probe response signal. Therefore, QTSA3 determines that the received probe response signal has been transmitted from a wireless terminal currently associated with the system identification data of the same service set (SSID). In step S1104 and thereafter, processing for temporarily storing the address of the transmission source of the probe response signal as an address of a wireless terminal capable of using DLS is performed.

In step S1004, it is recognized that a link using DLS is settable with the transmission source wireless terminal (QSTA2) of the received probe response signal.

In step S1005, a source address 712 which is the address of the transmission source is extracted from the probe response signal.

In step S1006, the source address 712 extracted in step S1005 is temporarily stored in the DLS availability storage unit 206 as an address of a wireless terminal capable of using DLS. A single processing unit of probe response reception processing is hereby concluded.

Through the above processing, the media server terminal QSTA3 determines that setting of a wireless communication channel for stream data communication using DLS to the media renderer terminal QSTA1 is impossible. At this point, processing is performed (2201 to 2203) for setting a wireless communication channel for stream data communication using an indirect link service via QAP4.

Having accepted a setting request for a wireless communication channel which uses an indirect link service via QAP4 from a new terminal (QSTA3), QSTA1 commences (2300 to 2306) processing for probing a communication channel capable of performing communication by DLS, in a similar manner to the first to third embodiments. In other words, probe processing is performed based on transmission and reception of probe request signals and probe response signals. Since this processing is the same as those described earlier, details thereof will be omitted.

As a result of this probe processing, if it is determined that communication by DLS is possible between QSTA2, which is currently receiving stream data through indirect link service, stream data communication between QSTA2 is switched to communication with DLS. In other words, as is the case in the third embodiment, processing of reference numerals 2400 to 2405 is performed to continue transfer of stream data (2500 to 2502 and 2003 in FIG. 22). Once DLS communication commences, since the TS set until then for communication with the QAP becomes unnecessary, QSTA2 requests (2503) the QAP to open the TS.

Next, processing (2204 to 2208) is executed for setting a wireless communication channel between the media server terminal QSTA3 for stream data communication using indirect link service, and stream data is received (2209 and 2210) from QSTA3.

As described above, in the configuration according to the present embodiment, wireless terminals capable of communication by DLS are detected during stream data communication, using changes in system status, such as a change in the number of access object terminals, as a trigger. Based on such detection, communication with a relevant terminal is automatically switched to communication by DLS. This enables ongoing communication with parties to be maintained, while commencing communication with terminals which have subsequently requested communication. Therefore, wireless terminals which use less wireless resources may be detected so that the limited wireless media resources may be utilized in an efficient manner.

Events which trigger commencement of the processing for detecting availability of communication by DLS are not limited to those cited in the third and fourth embodiments. In addition, instead of using an occurrence of a predetermined event as a trigger to perform processing for detecting availability of communication by DLS, such events may be arranged to be performed on a regular basis.

Fifth Embodiment

While each station was described to be equipped with a DLS function in each embodiment described above, in actuality, not all stations are equipped with DLS functions. In a wireless communication system which includes such terminals without DLS functions, information indicating whether DLS is enabled may be transmitted together with a probe response signal the event that a probe response signal is received from a terminal capable of DLS, communication by DLS is performed as described heretofore. In the event that a probe response signal is received from a terminal not supporting DLS, since it is apparent that the terminal exists within direct communication range, the terminal will be capable of communication in ad hoc mode even though it is incapable of communication by DLS. Therefore, in such cases, wireless, resources may be utilized in an efficient manner by performing communication in ad hoc mode. Information indicating whether DLS is enabled may be included in probe response signals to be transmitted, or otherwise may be transmitted as a signal independent of probe response signals.

Other Embodiments

While a network system using an IEEE 802.11e/D12-compliant QoS wireless LAN as a wireless communication medium has been exemplified for configurations according to the first to fourth embodiments, applicable wireless communication media are not limited to this example. In other words, any communication medium may be used, as long as such a medium allows selective use of communication by indirect link and communication by direct link.

It is needless to say that the object of the present invention may also be achieved as follows. In other words, the present invention may be achieved by supplying a storage medium storing program codes of software which achieves the above-described functions to a system or an apparatus, and having a computer of the system or the apparatus read out and execute the program codes stored in the storage medium. The computer may be replaced by a CPU, a MPU or the like. In this case, the program codes themselves, read out from the storage media, achieve the functions of the above mentioned embodiments, and the storage media containing the program codes compose the present invention.

Storage devices which may be used to provide the program codes can be supplied include, for instance, a flexible disk, a hard disk, an optical dick, a magneto-optical disk, a CD-ROM, a CD-R, a magnetic tape, a nonvolatile memory card, a ROM, a DVD or the like.

Executing program codes read out by a computer is not the only method to, achieve the functions of the above-described embodiments. It is needless to say that the present invention also includes, for instance, cases in which an OS (Operating System) or the like running on the computer partially or entirely performs the actual processing, and functions of the above-described embodiments are achieved by such processing.

In addition, it is needless to say that the present invention also includes cases where functions of the above-described embodiments are achieved by processing described below. In other words, the program codes read out from the storage media are written into a memory provided on a function extension board inserted into a computer or a function extension unit connected to the computer. In this case, all of or a part of the actual processing is performed by a CPU or the like provided on the function extension board or the function extension unit according to instructions from the program codes. The functions of the above-described embodiments are achieved also by such processing.

As described above, according to the present invention, it is possible to provide a technique for determining availability of a wireless direct link which does not require expansion of processing by a base station and preliminary establishment of a communication party terminal, and which has a small communication traffic load.

While the present invention has been described with reference to exemplary embodiments, it is to be understood that the invention is not limited to the disclosed exemplary embodiments. The scope of the following Claims is to be accorded the broadest interpretation so as to encompass all such modifications and equivalent structures and functions.

This application claims the benefit of Japanese Patent Application No. 2005-295554, filed Oct. 7, 2005, which is hereby incorporated by reference herein in its entirety.

The invention claimed is:

1. An information processing apparatus comprising:
    a wireless communication unit which is constructed to wirelessly communicate with another communication apparatus by a direct link and by an indirect link via a control apparatus;
    a sending unit constructed to send a probe signal which includes identification information of a network established by the control apparatus, in response to receiving a request for setting of a communication channel from a first communication apparatus during communication with a second communication apparatus by the indirect link;
    a receiving unit constructed to receive directly from a communication apparatus a response signal sent by the communication apparatus based on the identification information included in the probe signal;
    a determination unit constructed to determine a communication apparatus that is able to communicate with the information processing apparatus by the direct link, based on the response signal received by the receiving unit; and
    a switch unit constructed to switch the indirect link with the second communication apparatus to a direct link with the second communication apparatus, in the case that the determination unit determines that the second communication apparatus is able to communicate with the information processing apparatus by the direct link.

2. The information processing apparatus according to claim 1, wherein said response signal includes device identification data which identifies the communication apparatus which has transmitted the response signal, and further comprising:
    an identification unit constructed to identify the communication apparatus which has transmitted the response signal based on the device identification data included in the response signal.

3. The information processing apparatus according to claim 1, wherein when the received response signal includes information indicating that the communication apparatus that sent the response signal is associated with said control apparatus, said determination unit determines that communication by the direct link with the communication apparatus which transmitted said response signal is possible.

4. The information processing apparatus according to claim 1, further comprising:
    an acquisition unit constructed to acquire list information from other communication apparatuses via a network regarding stream data providable by the other communication apparatuses; and
    a display control unit constructed to display a list of providable stream data for each communication apparatus on a display unit, based on the list information acquired by said acquisition unit.

5. The information processing apparatus according to claim 4, wherein said response signal further includes capacity information which indicates usable communication capacity of a communication channel used for stream data transfer, and said display control unit displays stream data communicable via said communication channel to be identifiable, based on said capacity information.

6. The information processing apparatus according to claim 1, wherein said response signal includes information regarding a communication capacity by the direct link, and said determination unit determines the communication apparatuses that are able to communicate with the information processing apparatus by the direct link based on the information regarding said communication capacity by the direct link included in said response signal.

7. The information processing apparatus according to claim 1, wherein the sending unit sends said probe signal in the case that the request for setting of the communication channel is received.

8. The information processing apparatus according to claim 1, wherein said response signal includes information indicating an association with said control apparatus.

9. The information processing apparatus according to claim 1, wherein a communication channel used for stream data transfer between another external apparatus may be set, and said response signal further includes information indicating a communication capacity usable by said communication channel.

10. The information processing apparatus according to claim 1, wherein said response signal includes information indicating whether communication by the direct link is possible.

11. An information processing system equipped with a plurality of information processing apparatuses, wherein said plurality of information processing apparatuses includes:

a first information processing apparatus comprising:

a wireless communication unit constructed to wirelessly communicate with another communication apparatus by a direct link and by an indirect link via a control apparatus;

a sending unit constructed to send a probe signal which includes identification information of a network established by the control apparatus, in response to receiving a request for setting of a communication channel from a first communication apparatus during communication with a second communication apparatus by the indirect link;

a receiving unit constructed to receive directly from a communication apparatus a response signal sent by the communication apparatus based on the identification information included in the probe signal;

a determination unit constructed to determine a communication apparatus that is able to communicate with the first information processing apparatus by the direct link, based on the response signal received by the receiving unit; and a switch unit constructed to switch the indirect link with the second communication apparatus to the direct link with the second communication apparatus, in the case that the determination unit determines that the second communication apparatus is able to communicate with the first information processing apparatus by the direct link.

12. A control method for an information processing apparatus, said control method comprising the steps of:

wirelessly communicating with another communication apparatus by a direct link and by an indirect link via a control apparatus;

sending a probe signal which includes identification information of a network established by the control apparatus, in response to receiving a request for setting of a communication channel from a first communication apparatus during communication with a second communication apparatus by the indirect link;

receiving directly from a communication apparatus a response signal sent by the communication apparatus based on the identification information included in the probe signal;

determining a communication apparatus that is able to communicate with the information processing apparatus by the direct link, based on the response signal received in the receiving step; and switching the indirect link with the second communication apparatus to the direct link with the second communication apparatus, in the case that the determining step determines that the second communication apparatus is able to communicate with the information processing apparatus by the direct link.

13. A non-transitory computer-readable storage medium storing a computer program that, when executed, enables a computer to execute the control method according to claim 12.

* * * * *